(12) United States Patent
Janeczko et al.

(10) Patent No.: US 6,791,760 B2
(45) Date of Patent: Sep. 14, 2004

(54) PLANAR DIFFRACTIVE RELAY

(75) Inventors: Donald John Janeczko, Fincastle, VA (US); Anthony Mong-On Tai, Northville, MI (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 10/195,098

(22) Filed: Jul. 12, 2002

(65) Prior Publication Data

US 2003/0020006 A1 Jan. 30, 2003

Related U.S. Application Data

(60) Provisional application No. 60/307,547, filed on Jul. 24, 2001.

(51) Int. Cl.[7] ............................. G02B 27/14; G09G 5/00
(52) U.S. Cl. ............................................ 359/630; 345/8
(58) Field of Search .................................. 359/630–632, 359/618, 637, 639–641; 345/7–9

(56) References Cited

U.S. PATENT DOCUMENTS

| 4,093,354 | A | * | 6/1978 | Fletcher et al. ............. 359/633 |
| 4,653,879 | A |   | 3/1987 | Filipovich |
| 4,711,512 | A | * | 12/1987 | Upatnieks ................... 359/630 |
| 4,930,847 | A | * | 6/1990 | Cederquist .................. 359/630 |
| 5,453,877 | A | * | 9/1995 | Gerbe et al. ................ 359/631 |
| 5,682,255 | A |   | 10/1997 | Friesem et al. |
| 5,699,194 | A |   | 12/1997 | Takahashi |
| 5,701,202 | A |   | 12/1997 | Takahashi |
| 5,706,136 | A |   | 1/1998 | Okuyama et al. |
| 5,712,726 | A |   | 1/1998 | Espie et al. |
| 5,724,163 | A |   | 3/1998 | David |
| 5,764,417 | A |   | 6/1998 | Francois et al. |
| 5,867,313 | A |   | 2/1999 | Schweitzer et al. |
| 5,966,223 | A |   | 10/1999 | Friesem et al. |
| 6,088,165 | A |   | 7/2000 | Janeczko et al. |
| RE37,169 | E | * | 5/2001 | Togino ....................... 359/633 |
| 6,310,736 | B1 | * | 10/2001 | Togino ....................... 359/631 |
| 6,563,648 | B2 | * | 5/2003 | Gleckman et al. .......... 359/630 |

FOREIGN PATENT DOCUMENTS

| EP | 0 908 750 A2 | 4/1999 |
| GB | WO98/20380 | * 5/1998 | ........... G02B/27/01 |
| WO | WO00/79330 A1 | 12/2000 |

* cited by examiner

Primary Examiner—Georgia Epps
Assistant Examiner—Alicia M. Harrington
(74) Attorney, Agent, or Firm—RatnerPrestia

(57) ABSTRACT

The present invention relates to an optical system for directing light from an image source to a viewer's eye. The system includes an image source providing an image source light; a collimator for receiving the image source light and converting the received image source light into a collimated light projected along a first optical path; and a planar diffractive relay including opposing planar surfaces longitudinally oriented substantially along a second optical path, the opposing planar surfaces terminating into an input tilted surface and an output tilted surface. The collimated light is projected along the first optical path and redirected by the input tilted surface as propagated light traveling in the second optical path. The propagated light traveling in the second optical path is redirected by the output tilted surface into a third optical path directed toward the viewer's eye.

25 Claims, 28 Drawing Sheets

TITLE: I^2 OBJECTIVE (74)

GENERAL LENS DATA:

| | |
|---|---|
| SURFACES | : 26 |
| STOP | : 27 |
| SYSTEM APERTURE | : FLOAT BY STOP SIZE = 6.5 |
| GLASS CATALOGS | : SCHOTT INFRARED schott_2000 ohara |
| RAY AIMING | : REAL REFERENCE, CACHE ON |
| X PUPIL SHIFT | : 0 |
| Y PUPIL SHIFT | : 0 |
| Z PUPIL SHIFT | : 0 |
| APODIZATION | : UNIFORM, FACTOR = 0.00000E+000 |
| EFFECTIVE FOCAL LENGTH | : 23.72442 (IN AIR AT SYSTEM TEMPERATURE AND PRESSURE) |
| EFFECTIVE FOCAL LENGTH | : 23.72442 (IN IMAGE SPACE) |
| BACK FOCAL LENGTH | : 21.52805 |
| TOTAL TRACK | : 49.42672 |
| IMAGE SPACE F/# | : 1.300901 |
| PARAXIAL WORKING F/# | : 0.3258217 |
| WORKING F/# | : 0.8119875 |
| IMAGE SPACE NA | : 0.3587625 |
| OBJECT SPACE NA | : 9.118459e-010 |
| STOP RADIUS | : 6.5 |
| PARAXIAL IMAGE HEIGHT | : 8.430766 |
| PARAXIAL MAGNIFICATION | : 0 |
| ENTRANCE PUPIL DIAMETER | : 18.23692 |
| ENTRANCE PUPIL POSITION | : 27.36426 |
| EXIT PUPIL DIAMETER | : 13 |
| EXIT PUPIL POSITION | : -353.0559 |
| FIELD TYPE | : ANGLE IN DEGREES |
| MAXIMUM FIELD | : 20 |
| PRIMARY WAVE | : 0.716 |
| LENS UNITS | : MILLIMETERS |
| ANGULAR MAGNIFICATION | : -1.40284 |
| FIELDS | : 3 |

FIELD TYPE: ANGLE IN DEGREES

FIG. 16A

| # | X-VALUE | Y-VALUE | WEIGHT |
|---|---|---|---|
| 1 | 0.000000 | 0.000000 | 1.000000 |
| 2 | 0.000000 | 14.000000 | 1.000000 |
| 3 | 0.000000 | 20.000000 | 0.100000 |

VIGNETTING FACTORS

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | -0.223812 | 0.024292 | 0.223835 | 0.000000 |
| 3 | 0.000000 | -0.347049 | 0.060064 | 0.347083 | 0.000000 |

WAVELENGTHS : 5
UNITS: MICRONS

| # | VALUE | WEIGHT |
|---|---|---|
| 1 | 0.851000 | 70.000000 |
| 2 | 0.788000 | 90.000000 |
| 3 | 0.716000 | 72.000000 |
| 4 | 0.658000 | 21.000000 |
| 5 | 0.540000 | 10.000000 |

SURFACE DATA SUMMARY:

| SURF | TYPE | COMMENT | RADIUS | THICKNESS | GLASS | DIAMETER | CONIC |
|---|---|---|---|---|---|---|---|
| OBJ | STANDARD | 72 | INFINITY | INFINITY | | 0 | 0 |
| 1 | STANDARD | 110 | -24.08629 | 1 | BPM51 | 19 | 0 |
| 2 | STANDARD | 110 | 48.0838 | 3.76 | | 20.29476 | 0 |
| 3 | STANDARD | 112 | -25.77575 | 3.62 | N-SF10 | 20.73559 | 0 |
| 4 | STANDARD | 112 | -16.23883 | 4.86 | S-LAL7 | 22.04238 | 0 |
| 5 | STANDARD | 112 | -23.277 | 0.5 | | 26.32409 | 0 |
| 6 | EVENASPH | 114 | 23.47164 | 6.72 | N-BAF10 | 31.61528 | 1.024635 |
| 7 | STANDARD | 114 | 463.8926 | 4.83 | | 31.2136 | 0 |
| 8 | STANDARD | 116 | -40.70873 | 2.3 | S-LAH60 | 30.63541 | 0 |
| 9 | STANDARD | 116 | -35.51175 | 0.4999853 | | 30.94818 | 0 |
| 10 | STANDARD | 118 | 59.06892 | 1 | N-SF56 | 27.93454 | 0 |
| 11 | STANDARD | 118 | 16.33235 | 8.2 | BSM2 | 25.28952 | 0 |

FIG. 16B

| | | | | | | |
|---|---|---|---|---|---|---|
| 12 STANDARD | 118 | -65.37185 | 0.5 | | 24.95955 | 0 |
| 13 STANDARD | 120 | 29.48099 | 1.26 | S-TIH53 | 21.78013 | 0 |
| 14 STANDARD | 120 | 15.49282 | 0.5 | | 19.7455 | 0 |
| 15 EVENASPH | 122 | 14.15182 | 4.84 | S-LAH65 | 20 | 0.2937393 |
| 16 STANDARD | 122 | 24.29994 | 5.03673 | | 18.51263 | 0 |
| STO STANDARD | | INFINITY | 0 | | 13 | 0 |
| 18 NONSEQCO | 124 | INFINITY | 0 | | 13 | 0 |
| 19 STANDARD | | INFINITY | 0 | | 13 | 0 |
| 20 STANDARD | | INFINITY | 0 | | 12.71781 | 0 |
| 21 STANDARD | | INFINITY | -3 | | 12.71781 | 0 |
| 22 STANDARD | 83 | INFINITY | -2.3 | FK5 | 18 | 0 |
| 23 STANDARD | 83 | INFINITY | 0 | | 18 | 0 |
| 24 STANDARD | | INFINITY | 0 | | 18 | 0 |
| 25 STANDARD | | INFINITY | 0 | | 18 | 0 |
| IMA STANDARD | | INFINITY | | | 18 | 0 |

FIG. 16C

TITLE: FIR OBJECTIVE (76)
LENS NOTES:
      TYPICAL 8 TO 12 MICRON FIR OBJECTIVE LENS
GENERAL LENS DATA:

| | |
|---|---|
| SURFACES | 9 |
| STOP | 1 |
| SYSTEM APERTURE | IMAGE SPACE F/# = 1.6 |
| GLASS CATALOGS | SCHOTT INFRARED |
| RAY AIMING | OFF |
| APODIZATION | UNIFORM, FACTOR = 0.00000E+000 |
| EFFECTIVE FOCAL LENGTH | 18.51651 (IN AIR AT SYSTEM TEMPERATURE AND PRESSURE) |
| EFFECTIVE FOCAL LENGTH | 18.51651 (IN IMAGE SPACE) |
| BACK FOCAL LENGTH | 1.123433 |
| TOTAL TRACK | 44.49367 |
| IMAGE SPACE F/# | 1.6 |
| PARAXIAL WORKING F/# | 1.6 |
| WORKING F/# | 1.622562 |
| IMAGE SPACE NA | 0.298275 |
| OBJECT SPACE NA | 5.786411e-010 |
| STOP RADIUS | 5.786411 |
| PARAXIAL IMAGE HEIGHT | 4.738285 |
| PARAXIAL MAGNIFICATION | 0 |
| ENTRANCE PUPIL DIAMETER | 11.57282 |
| ENTRANCE PUPIL POSITION | 0 |
| EXIT PUPIL DIAMETER | 8.823024 |
| EXIT PUPIL POSITION | 14.52531 |
| FIELD TYPE | REAL IMAGE HEIGHT IN MILLIMETERS |
| MAXIMUM FIELD | 4.68 |
| PRIMARY WAVE | 10 |
| LENS UNITS | MILLIMETERS |
| ANGULAR MAGNIFICATION | -1.311662 |

FIELDS      : 4
FIELD TYPE: REAL IMAGE HEIGHT IN MILLIMETERS

| # | X-VALUE | Y-VALUE | WEIGHT |
|---|---|---|---|
| 1 | 0.000000 | 0.000000 | 1.000000 |
| 2 | 0.000000 | 2.808000 | 0.500000 |
| 3 | 0.000000 | 3.744000 | 0.300000 |

FIG. 17A

| | | | |
|---|---|---|---|
| 4 | 0.000000 | 4.680000 | 1.000000 |

VIGNETTING FACTORS

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |

WAVELENGTHS : 3
UNITS: MICRONS

| # | VALUE | WEIGHT |
|---|---|---|
| 1 | 8.000000 | 1.000000 |
| 2 | 10.000000 | 1.000000 |
| 3 | 11.700000 | 1.000000 |

SURFACE DATA SUMMARY:

| SURF NIC | TYPE | COMMENT | RADIUS | THICKNESS | GLASS | DIAMETER | CO |
|---|---|---|---|---|---|---|---|
| OBJ | STANDARD | 72 | INFINITY | INFINITY | | 0 | 0 |
| STO | STANDARD | 72 | INFINITY | 10 | | 11.57282 | 0 |
| 2 | STANDARD | 130 | 55 | 4 | TI_1173 | 16.82865 | 0 |
| 3 | STANDARD | 130 | INFINITY | 22 | | 16.79749 | 0 |
| 4 | STANDARD | 132 | 18 | 4 | TI_1173 | 16.22197 | 0 |
| 5 | STANDARD | 132 | 110 | 0.6 | | 14.80168 | 0 |
| 6 | STANDARD | | INFINITY | 2.3 | | 14.2804 | 0 |
| 7 | STANDARD | 134 | INFINITY | 1.016 | GERMANIUM | 10.4173 | 0 |
| 8 | STANDARD | 134 | INFINITY | 0.7149562 | | 10.08567 | 0 |
| IMA | STANDARD | 135 | INFINITY | | | 9.443375 | 0 |

FIG. 17B

TITLE: VISUAL OPTIC TRAIN (92, 90, 88, 86, 84, & 80)

GENERAL LENS DATA:

| | |
|---|---|
| SURFACES | 55 |
| STOP | 1 |
| SYSTEM APERTURE | ENTRANCE PUPIL DIAMETER = 10 |
| GLASS CATALOGS | misc_ schott_2000 oharav schott ohara |
| RAY AIMING | OFF |
| APODIZATION | UNIFORM, FACTOR = 0.00000E+000 |
| EFFECTIVE FOCAL LENGTH | 37.55173 (IN AIR AT SYSTEM TEMPERATURE AND PRESSURE) |
| EFFECTIVE FOCAL LENGTH | 33.55173 (IN IMAGE SPACE) |
| BACK FOCAL LENGTH | 12.56452 |
| TOTAL TRACK | 116.25 |
| IMAGE SPACE F/# | 3.755173 |
| PARAXIAL WORKING F/# | 3.576089 |
| WORKING F/# | 1.046907 |
| IMAGE SPACE NA | 0.1384706 |
| OBJECT SPACE NA | 0.002499992 |
| STOP RADIUS | 5 |
| PARAXIAL IMAGE HEIGHT | 9.582102 |
| PARAXIAL MAGNIFICATION | 0.01788045 |
| ENTRANCE PUPIL DIAMETER | 10 |
| ENTRANCE PUPIL POSITION | 0 |
| EXIT PUPIL DIAMETER | 3.749325 |
| EXIT PUPIL POSITION | -3.514844 |
| FIELD TYPE | ANGLE IN DEGREES |
| MAXIMUM FIELD | 15 |
| PRIMARY WAVE | 0.545 |
| LENS UNITS | MILLIMETERS |
| ANGULAR MAGNIFICATION | 2.667147 |

FIELDS       : 4
FIELD TYPE: ANGLE IN DEGREES

| # | X-VALUE | Y-VALUE | WEIGHT |
|---|---------|---------|--------|
| 1 | 0.000000 | 0.000000 | 2.000000 |
| 2 | 0.000000 | 9.000000 | 1.000000 |
| 3 | 12.000000 | 0.000000 | 1.000000 |
| 4 | 12.000000 | 9.000000 | 0.500000 |

FIG. 18A

VIGNETTING FACTORS
| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.266172 | 0.033391 | 0.266199 | 0.000000 |
| 3 | 0.337688 | 0.000000 | 0.337722 | 0.053641 | 0.000000 |
| 4 | 0.260882 | 0.204758 | 0.272625 | 0.226327 | 0.000000 |

WAVELENGTHS : 3
UNITS: MICRONS
| # | VALUE | WEIGHT |
|---|---|---|
| 1 | 0.540000 | 0.500000 |
| 2 | 0.545000 | 1.000000 |
| 3 | 0.550000 | 0.500000 |

LENS NOTES:

SURFACE DATA SUMMARY:

| SURF | TYPE | COMMENT | RADIUS | THICKNESS | GLASS | DIAM | PARAMETER | CONIC |
|---|---|---|---|---|---|---|---|---|
| OBJ | STANDARD | OBJECT | INFINITY | -2000 |  | 1060 | .309 | 0 |
| STO | STANDARD | 94 | INFINITY | 25 |  | 10.7 | 6007 | 0 |
| 2 | EVENASPH | 92 | 23.86548 | 5 | ACRYLIC | 26 | 0.9132005 |  |
| 3 | BINARY_2 | 92 | INFINITY | 0.1 |  | 26 |  | 0 |
| 4 | STANDARD | 90 | INFINITY | 7.5 | ACRYLIC | 25.8 | 6233 | 0 |
| 5 | COORDBRK | 90 | _ | 0 | _ | _ |  |  |
| 6 | STANDARD | 90 | INFINITY | 0 | MIRROR | 26.8 | 4588 | 0 |
| 7 | COORDBRK | 90 | _ | -7.5 | _ | _ |  |  |
| 8 | STANDARD | 90 | INFINITY | 0 | ACRYLIC | 32.1 | 3042 | 0 |
| 9 | STANDARD | 90 | INFINITY | 0 | MIRROR | 32.1 | 3042 | 0 |
| 10 | COORDBRK | 90 | _ | 15 | _ | _ |  |  |
| 11 | STANDARD | 90 | INFINITY | 0 | ACRYLIC | 28.5 | 9657 | 0 |
| 12 | STANDARD | 90 | INFINITY | 0 | MIRROR | 28.5 | 9657 | 0 |
| 13 | COORDBRK | 90 | _ | -15 | _ | _ |  |  |
| 14 | STANDARD | 90 | INFINITY | 0 | ACRYLIC | 50.0 | 8383 | 0 |
| 15 | STANDARD | 90 | INFINITY | 7.5 | MIRROR | 50.0 |  |  |

FIG. 18B

| # | Type | Param | Radius | Thickness | Material | Diameter |
|---|---|---|---|---|---|---|
| | | 8383 | | 0 | | |
| 16 | COORDBRK | 90 | — | 0 | — | — |
| 17 | STANDARD | 90 | INFINITY | 0 | ACRYLIC | 24.9 |
| | | 6931 | | 0 | | |
| 18 | STANDARD | 90 | INFINITY | 0 | MIRROR | 24.9 |
| | | 6931 | | 0 | | |
| 19 | COORDBRK | 90 | — | -7.5 | — | — |
| 20 | STANDARD | 90 | INFINITY | -0.1 | | 25.4 |
| | | 9763 | | 0 | | |
| 21 | BINARY_2 | 88 | INFINITY | -5 | ACRYLIC | 29 |
| | | 0 | | | | |
| 22 | EVENASPH | 88 | 33.15523 | -10.4 | | 29 |
| | | -3.270732 | | | | |
| 23 | STANDARD | 168 | -17.823 | -4.75 | SSKN5 | 21.8 |
| | | 4009 | | 0 | | |
| 24 | STANDARD | 168 | -30.24 | -7.33 | | 19.9 |
| | | 0519 | | 0 | | |
| 25 | STANDARD | | INFINITY | -4 | | 15.7 |
| | | 8018 | | 0 | | |
| 26 | STANDARD | 166 | INFINITY | -2 | N-BK7 | 12.8 |
| | | 5742 | | 0 | | |
| 27 | STANDARD | 166 | INFINITY | -4.35 | | 11.9 |
| | | 2983 | | 0 | | |
| 28 | STANDARD | 164 | 12.411 | -5.03 | LAK9 | 9.43 |
| | | 154 | | 0 | | |
| 29 | STANDARD | 164 | 8.389 | -4.68 | SF4 | 10.0 |
| | | 5031 | | 0 | | |
| 30 | STANDARD | 164 | 15.212 | -1.97 | | 11.5 |
| | | 2701 | | 0 | | |
| 31 | STANDARD | 162 | -16.5 | -4.18 | SF13 | 11.0 |
| | | 633 | | 0 | | |
| 32 | STANDARD | 162 | 37.614 | -1.74 | | 10.8 |
| | | 6015 | | 0 | | |
| 33 | STANDARD | 160 | 17.031 | -0.98 | KF9 | 10.3 |
| | | 9432 | | 0 | | |
| 34 | STANDARD | 160 | -6.837 | -4.27 | S-LAH58 | 10.3 |
| | | 9299 | | 0 | | |
| 35 | STANDARD | 160 | 9.254 | -2.35 | | 9.13 |
| | | 107 | | 0 | | |
| 36 | STANDARD | 84 | INFINITY | -16 | N-BK7 | 16 |
| | | 0 | | | | |
| 37 | STANDARD | 84 | INFINITY | -1.8 | | 11.6 |
| | | 2048 | | 0 | | |
| 38 | STANDARD | 150 | -12.24 | -4.52 | N-LAK22 | 15.8 |
| | | 4595 | | 0 | | |
| 39 | STANDARD | 150 | INFINITY | -0.3 | | 15.4 |
| | | 76 | | 0 | | |
| 40 | STANDARD | 148 | -10.46 | -2.92 | S-TIH53 | 14.2 |

FIG. 18C

| | | | | | |
|---|---|---|---|---|---|
| 7787 | | 0 | | | |
| 41 STANDARD | 148.7536 | -6.9 | -3.88 | | 11.2 |
| 42 STANDARD | 146.2623 | -40.6 | -3.2 | N-LAK22 | 11.6 |
| 43 STANDARD | 146.0617 | 20.257 | -5.5 | | 11.7 |
| 44 COORDBRK | | _ | 0 | _ | _ |
| 45 STANDARD | 144.7038 | INFINITY | 0 | MIRROR | 14.9 |
| 46 COORDBRK | | _ | 7 | _ | _ |
| 47 STANDARD | 142.2836 | 12.244 | 2.75 | N-LAK22 | 10.7 |
| 48 STANDARD | 142.0327 | INFINITY | 0.3 | | 10.2 |
| 49 STANDARD | 140.9998 | 5.47 | 3.64 | N-LAK22 | 8.73 |
| 50 STANDARD | 140.0104 | 10 | 2.31 | | 6.29 |
| 51 STANDARD | 138.2721 | -8.26 | 1.97 | N-LAK22 | 4.52 |
| 52 STANDARD | 138.9423 | -22.31 | 0.63 | | 5.17 |
| 53 STANDARD | 136.6398 | 5.46 | 2.29 | S-TIH53 | 5.93 |
| 54 STANDARD | 136.4604 | 7.37 | 2 | | 5.25 |
| IMA STANDARD | 79.2302 | INFINITY | | | 6.11 |

SURFACE DATA DETAIL:
SURFACE OBJ       : STANDARD
SURFACE STO       : STANDARD
SURFACE   2       : EVENASPH LENS 1
  COEFF ON R  2   :            0
  COEFF ON R  4   :  2.9553845e-005
  COEFF ON R  6   : -2.781315e-007
  COEFF ON R  8   :  2.7091944e-010
  COEFF ON R 10   :            0
  COEFF ON R 12   :            0
  COEFF ON R 14   :            0
  COEFF ON R 16   :            0
  APERTURE        : CIRCULAR APERTURE
  MINIMUM RADIUS  :            0
  MAXIMUM RADIUS  :         13.5
SURFACE   3       : BINARY_2 LENS 1
  DIFFRACT ORDER  :            1

FIG. 18D

| | | |
|---|---|---|
| COEFF ON R  2 | : | 0 |
| COEFF ON R  4 | : | 0 |
| COEFF ON R  6 | : | 0 |
| COEFF ON R  8 | : | 0 |
| COEFF ON R 10 | : | 0 |
| COEFF ON R 12 | : | 0 |
| COEFF ON R 14 | : | 0 |
| COEFF ON R 16 | : | 0 |
| MAXIMUM TERM | : | 6 |
| MAXIMUM RAD AP | : | 1 |
| TERM ON P TO  2 | : | -51.84534 |
| TERM ON P TO  4 | : | 0.3363826 |
| TERM ON P TO  6 | : | -0.0013670494 |
| TERM ON P TO  8 | : | 2.1742388e-006 |
| TERM ON P TO 10 | : | -6.8712746e-009 |
| TERM ON P TO 12 | : | 3.2326837e-011 |
| APERTURE | : | CIRCULAR APERTURE |
| MINIMUM RADIUS | : | 0 |
| MAXIMUM RADIUS | : | 13.5 |
| SURFACE   4 | : | STANDARD RELAY PRISM |
| APERTURE | : | RECTANGULAR APERTURE |
| X HALF WIDTH | : | 15 |
| Y HALF WIDTH | : | 15 |
| X- DECENTER | : | 0 |
| Y- DECENTER | : | -1 |
| SURFACE   5 | : | COORDBRK RELAY PRISM |
| DECENTER X | : | 0 |
| DECENTER Y | : | 0 |
| TILT ABOUT X | : | -29 |
| TILT ABOUT Y | : | 0 |
| TILT ABOUT Z | : | 0 |
| ORDER | : | DECENTER THEN TILT |
| SURFACE   6 | : | STANDARD RELAY PRISM |
| APERTURE | : | RECTANGULAR APERTURE |
| X HALF WIDTH | : | 15 |
| Y HALF WIDTH | : | 15.5 |
| SURFACE   7 | : | COORDBRK RELAY PRISM |
| DECENTER X | : | 0 |
| DECENTER Y | : | 0 |
| TILT ABOUT X | : | -29 |
| TILT ABOUT Y | : | 0 |
| TILT ABOUT Z | : | 0 |
| ORDER | : | TILT THE DECENTER |
| SURFACE   8 | : | STANDARD RELAY PRISM |
| APERTURE | : | RECTANGULAR APERTURE |
| X HALF WIDTH | : | 15 |
| Y HALF WIDTH | : | 24 |
| X- DECENTER | : | 0 |

FIG. 18E

| | |
|---|---|
| Y- DECENTER | -10 |
| SURFACE 9 | STANDARD RELAY PRISM |
| APERTURE | RECTANGULAR APERTURE |
| X HALF WIDTH | 15 |
| Y HALF WIDTH | 24 |
| X- DECENTER | 0 |
| Y- DECENTER | -10 |
| SURFACE 10 | COORDBRK RELAY PRISM |
| DECENTER X | 0 |
| DECENTER Y | -35.956034 |
| TILT ABOUT X | 0 |
| TILT ABOUT Y | 0 |
| TILT ABOUT Z | 0 |
| ORDER | DECENTER THEN TILT |
| SURFACE 11 | STANDARD RELAY PRISM |
| APERTURE | RECTANGULAR APERTURE |
| X HALF WIDTH | 15 |
| Y HALF WIDTH | 23 |
| SURFACE 12 | STANDARD RELAY PRISM |
| APERTURE | RECTANGULAR APERTURE |
| X HALF WIDTH | 15 |
| Y HALF WIDTH | 23 |
| SURFACE 13 | COORDBRK RELAY PRISM |
| DECENTER X | 0 |
| DECENTER Y | -35.956034 |
| TILT ABOUT X | 0 |
| TILT ABOUT Y | 0 |
| TILT ABOUT Z | 0 |
| ORDER | DECENTER THEN TILT |
| SURFACE 14 | STANDARD RELAY PRISM |
| APERTURE | RECTANGULAR APERTURE |
| X HALF WIDTH | 15 |
| Y HALF WIDTH | 33 |
| X- DECENTER | 0 |
| Y- DECENTER | 20 |
| SURFACE 15 | STANDARD RELAY PRISM |
| APERTURE | RECTANGULAR APERTURE |
| X HALF WIDTH | 15 |
| Y HALF WIDTH | 33 |
| X- DECENTER | 0 |
| Y- DECENTER | 20 |
| SURFACE 16 | COORDBRK RELAY PRISM |
| DECENTER X | 0 |
| DECENTER Y | 0 |
| TILT ABOUT X | 29 |
| TILT ABOUT Y | 0 |
| TILT ABOUT Z | 0 |
| ORDER | DECENTER THEN TILT |

FIG. 18F

| | |
|---|---|
| SURFACE 17 | STANDARD RELAY PRISM |
| APERTURE | RECTANGULAR APERTURE |
| X HALF WIDTH | 15 |
| Y HALF WIDTH | 15.44798 |
| SURFACE 18 | STANDARD RELAY PRISM |
| APERTURE | RECTANGULAR APERTURE |
| X HALF WIDTH | 15 |
| Y HALF WIDTH | 15 |
| SURFACE 19 | COORDBRK RELAY PRISM |
| DECENTER X | 0 |
| DECENTER Y | -0.054557123 |
| TILT ABOUT X | -29 |
| TILT ABOUT Y | 0 |
| TILT ABOUT Z | 0 |
| ORDER | TILT THEN DECENTER |
| SURFACE 20 | STANDARD RELAY PRISM |
| APERTURE | RECTANGULAR APERTURE |
| X HALF WIDTH | 15 |
| Y HALF WIDTH | 15 |
| X- DECENTER | 0 |
| Y- DECENTER | 2 |
| SURFACE 21 | BINARY_2 LENS 2 |
| DIFFRACT ORDER | 1 |
| COEFF ON R 2 | 0 |
| COEFF ON R 4 | 0 |
| COEFF ON R 6 | 0 |
| COEFF ON R 8 | 0 |
| COEFF ON R 10 | 0 |
| COEFF ON R 12 | 0 |
| COEFF ON R 14 | 0 |
| COEFF ON R 16 | 0 |
| MAXIMUM TERM | 6 |
| MAXIMUM RAD AP | 1 |
| TERM ON P TO 2 | -20.145418 |
| TERM ON P TO 4 | -0.055587953 |
| TERM ON P TO 6 | 0.00029228957 |
| TERM ON P TO 8 | -7.1351534e-007 |
| TERM ON P TO 10 | 3.0965376e-009 |
| TERM ON P TO 12 | -4.8649791e-012 |
| APERTURE | FLOATING APERTURE |
| MAXIMUM RADIUS | 14.5 |
| SURFACE 22 | EVENASPH LENS 2 |
| COEFF ON R 2 | 0 |
| COEFF ON R 4 | -2.7741178e-006 |
| COEFF ON R 6 | 2.4088588e-008 |
| COEFF ON R 8 | 2.7492852e-011 |
| COEFF ON R 10 | 0 |
| COEFF ON R 12 | 0 |

FIG. 18G

| | | |
|---|---|---|
| COEFF ON R 14 | : | 0 |
| COEFF ON R 16 | : | 0 |
| APERTURE | : | FLOATING APERTURE |
| MAXIMUM RADIUS | : | 14.5 |
| SURFACE 23 | : | STANDARD LENS 3 |
| SURFACE 24 | : | STANDARD LENS 3 |
| SURFACE 25 | : | STANDARD |
| APERTURE | : | FLOATING APERTURE |
| MAXIMUM RADIUS | : | 7.890092 |
| SURFACE 26 | : | STANDARD FILTER |
| SURFACE 27 | : | STANDARD FILTER |
| SURFACE 28 | : | STANDARD DOUBLET 1 |
| SURFACE 29 | : | STANDARD DOUBLET 1 |
| SURFACE 30 | : | STANDARD DOUBLET 1 |
| SURFACE 31 | : | STANDARD LENS 4 |
| SURFACE 32 | : | STANDARD LENS 4 |
| SURFACE 33 | : | STANDARD DOUBLET 2 |
| SURFACE 34 | : | STANDARD DOUBLET 2 |
| SURFACE 35 | : | STANDARD DOUBLET 2 |
| SURFACE 36 | : | STANDARD COMBINER |
| APERTURE | : | FLOATING APERTURE |
| MAXIMUM RADIUS | : | 8 |
| SURFACE 37 | : | STANDARD |
| SURFACE 38 | : | STANDARD LENS 5 |
| SURFACE 39 | : | STANDARD LENS 5 |
| SURFACE 40 | : | STANDARD LENS 6 |
| SURFACE 41 | : | STANDARD LENS 6 |
| SURFACE 42 | : | STANDARD LENS 7 |
| SURFACE 43 | : | STANDARD LENS 7 |
| SURFACE 44 | : | COORDBRK |
| DECENTER X | : | 0 |
| DECENTER Y | : | 0 |
| TILT ABOUT X | : | 45 |
| TILT ABOUT Y | : | 0 |
| TILT ABOUT Z | : | 0 |
| ORDER | : | DECENTER THEN TILT |
| SURFACE 45 | : | STANDARD MIRROR |
| SURFACE 46 | : | COORDBRK |
| DECENTER X | : | 0 |
| DECENTER Y | : | 0 |
| TILT ABOUT X | : | 45 |
| TILT ABOUT Y | : | 0 |
| TILT ABOUT Z | : | 0 |
| ORDER | : | DECENTER THEN TILT |
| SURFACE 47 | : | STANDARD LENS 8 |
| SURFACE 48 | : | STANDARD LENS 8 |
| SURFACE 49 | : | STANDARD LENS 9 |
| SURFACE 50 | : | STANDARD LENS 9 |

FIG. 18H

SURFACE 51 : STANDARD LENS 10
SURFACE 52 : STANDARD LENS 10
SURFACE 53 : STANDARD LENS 11
SURFACE 54 : STANDARD LENS 11
SURFACE IMA : STANDARD II SCREEN

FIG. 18I

PLANAR DIFFRACTIVE RELAY

RELATED APPLICATIONS

This application claims priority of U.S. Provisional Patent Application Ser. No. 60/307,547 filed Jul. 24, 2001.

FIELD OF THE INVENTION

The present invention relates to a planar diffractive relay which may be mounted on the head or on a helmet to view a display, and more particularly, to view the display of a night vision device to provide night time viewing.

BACKGROUND OF THE INVENTION

Night vision systems include objective lenses, image intensifier tubes and eyepieces usually assembled in a straight line. Many night vision goggles extend out in front of a viewer's face and fail to provide compact low profiles for the viewer. Excessive weight of these systems causes head or neck strain and fatigue problems.

The operation of each of these night vision systems is similar. An objective lens collects light from a low illumination scene and focuses it onto a photocathode of an image intensifier tube. The photocathode converts this image into an electronic signal that is amplified and converted into an intensified image on a screen of the image tube. An eyepiece magnifies the screen image for viewing.

Several devices use a single objective to image a scene on a single image intensifier and split the output (ocular) side into two paths (for each eye) using mirrors or prisms. These devices are, for example, the US Army PVS-7 binocular night vision goggle and the Simrad GN1 Night Visions Goggle, disclosed in U.S. Pat. No. 5,712,726. The PVS-7 device does not have a low profile (extends 170 mm beyond the face of the viewer). The GN1 device lacks inter-pupilary adjustment.

Another device, known as the Filipovich/FJW compact see-through night vision goggles, is disclosed in U.S. Pat. No. 4,653,879. As disclosed, this device images a scene onto two separate image intensifier paths using conventional optical lenses and beam combining prisms to achieve a compact structure. The Filipovich device has a limited field of view and is heavy.

Yet another device, known as the Takahashi system, is disclosed in U.S. Pat. No. 5,699,194 and U.S. Pat. No. 5,701,202. A similar device, known as the Okuyama system, is disclosed in U.S. Pat. No. 5,706,136. Both devices use a compact, aspheric beam-combiner prism to directly superimpose an electronically generated scene on a directly viewed scene. The Takahashi and Okuyama systems have two major problems. While the optical performance is very good, the surfaces required to correct the aberrations can not be manufactured by normal polishing or single point diamond machining. Special very expensive molds with non-rotationally symmetric surfaces are required. Another problem is the input signal (image on the image intensifier) is oriented at an odd angle (38 degrees relative to the line-of-sight). An image intensifier and objective lens folded into such a system results in a high profile.

Another device, known as the Janeczko system, is disclosed in U.S. Pat. No. 6,088,165. The system uses a compact aspheric beam-combiner prism to superimpose an image from a folded image intensifier optical path and an image from a video input onto direct viewing by a viewer. While the Janeczko system has a lower profile (50 mm) than the PVS-7 system, the profile of the Janeczko system is still excessive.

A compact head-up display is disclosed by Upatneik in U.S. Pat. No. 4,711,512. The display uses two linear diffraction gratings on a planar waveguide for relaying an image from a CRT to a viewer's eye. While the Upatneiks system may have good image quality, it requires a collimator with a physical diameter of about six times the diameter of the eye pupil (60 mm for 10 mm eye pupil). This is unacceptable from a weight and profile consideration. Collimators having a diameter of 60 mm and a focal length of 25 mm are also difficult to fabricate (F number=0.42). The efficiency of the display is also low because its diffractive gratings only cover an incident parallel ray bundle that subtends an angle of +/−4 degrees before extinction.

SUMMARY OF THE INVENTION

To meet this and other needs, and in view of its purposes, the present invention provides an optical system for directing light from an image source to a viewer's eye. The optical system includes at least one image source providing an image source light; a collimator for receiving the image source light and converting the received image source light into a collimated light projected along a first optical path; and a planar diffractive relay including opposing planar surfaces longitudinally oriented substantially along a second optical path, the opposing planar surfaces terminating into an input tilted surface and an output tilted surface. The collimated light is (a) projected along the first optical path, (b) redirected by the input tilted surface as propagated light traveling in the second optical path, and (c) the propagated light traveling in the second optical path is redirected by the output tilted surface into a third optical path directed toward the viewer's eye.

In one embodiment, the input tilted surface and one surface of the opposing planar surfaces subtend an angle greater than half of a critical angle for producing substantially total internal reflection of the propagated light traveling in the second optical path. The input tilted surface includes a length dimension sufficiently large for receiving the collimated light projected from the collimator and redirecting the collimated light for the propagation in the second optical path.

In another embodiment, the output tilted surface and the one surface subtend an angle greater than half the critical angle for redirecting the propagated light into the third optical path.

It is understood that the foregoing general description and the following detailed description are exemplary, but are not restrictive, of the invention.

BRIEF DESCRIPTION OF THE DRAWING

The invention is best understood from the following detailed description when read in connection with the accompany drawing. Included in the drawing are the following figures:

FIGS. 16A–16C, 17A–17B and 18A–18I include surface details of various lenses used in the optical system illustrated in FIG. 3, in accordance with an embodiment of the present invention.

DETAILED DESCRIPTION OF THE INVENTION

Figure 1:
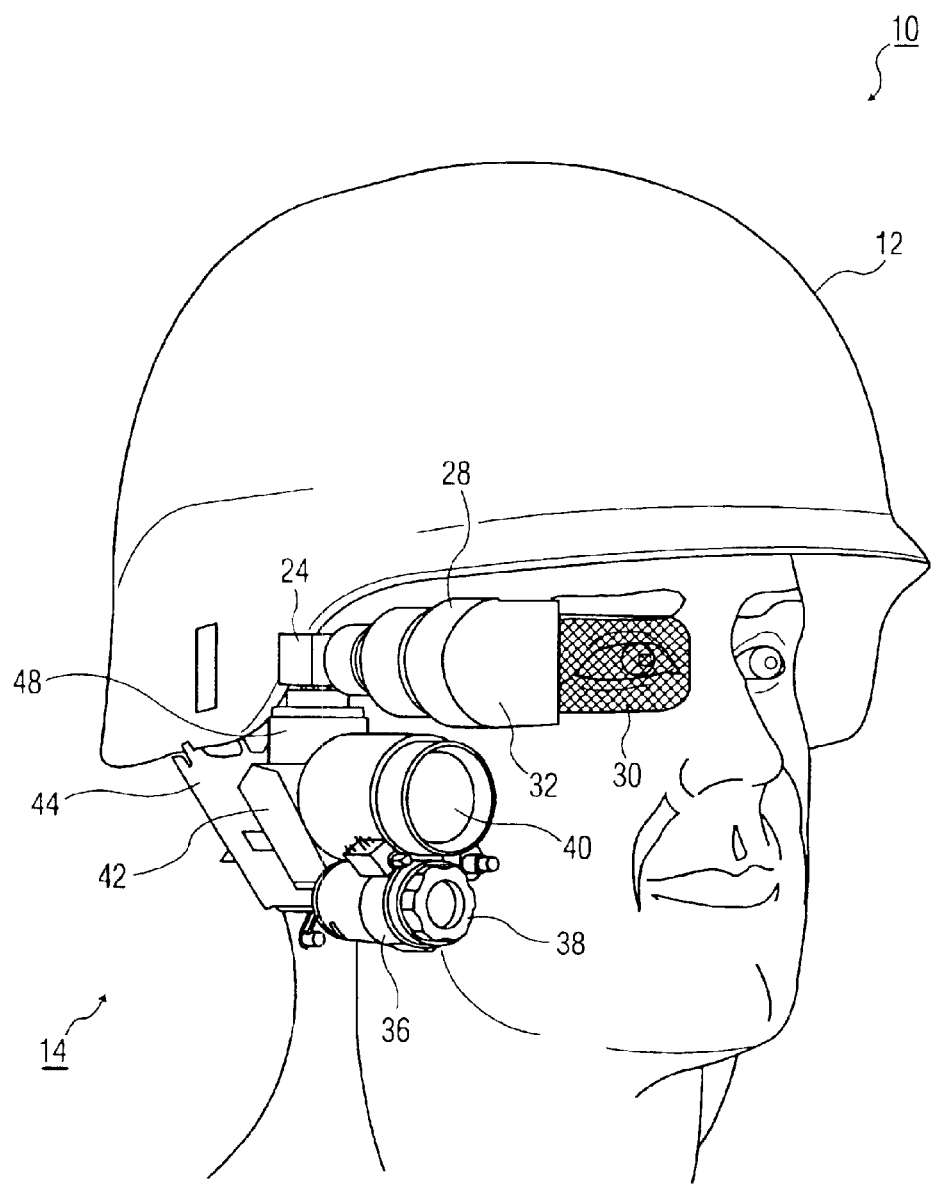
FIG. 1 is a perspective view of a night vision system resting on a viewer's head, constructed in accordance with and embodying an embodiment of the present invention.

Referring now to FIG. 1, there is shown a perspective view of night vision system 10 resting on a viewer's head according to an embodiment of the invention. Night vision system 10 includes optical assembly 14 mounted on helmet 12 for accommodating the right eye of the viewer. Also included is another optical assembly 14 (not shown) mounted on helmet 12 for accommodating the left eye of the viewer. Both assemblies are constructed as mirror images of each other. An exploded view of optical assembly 14 is shown in FIG. 2.

Figure 2:
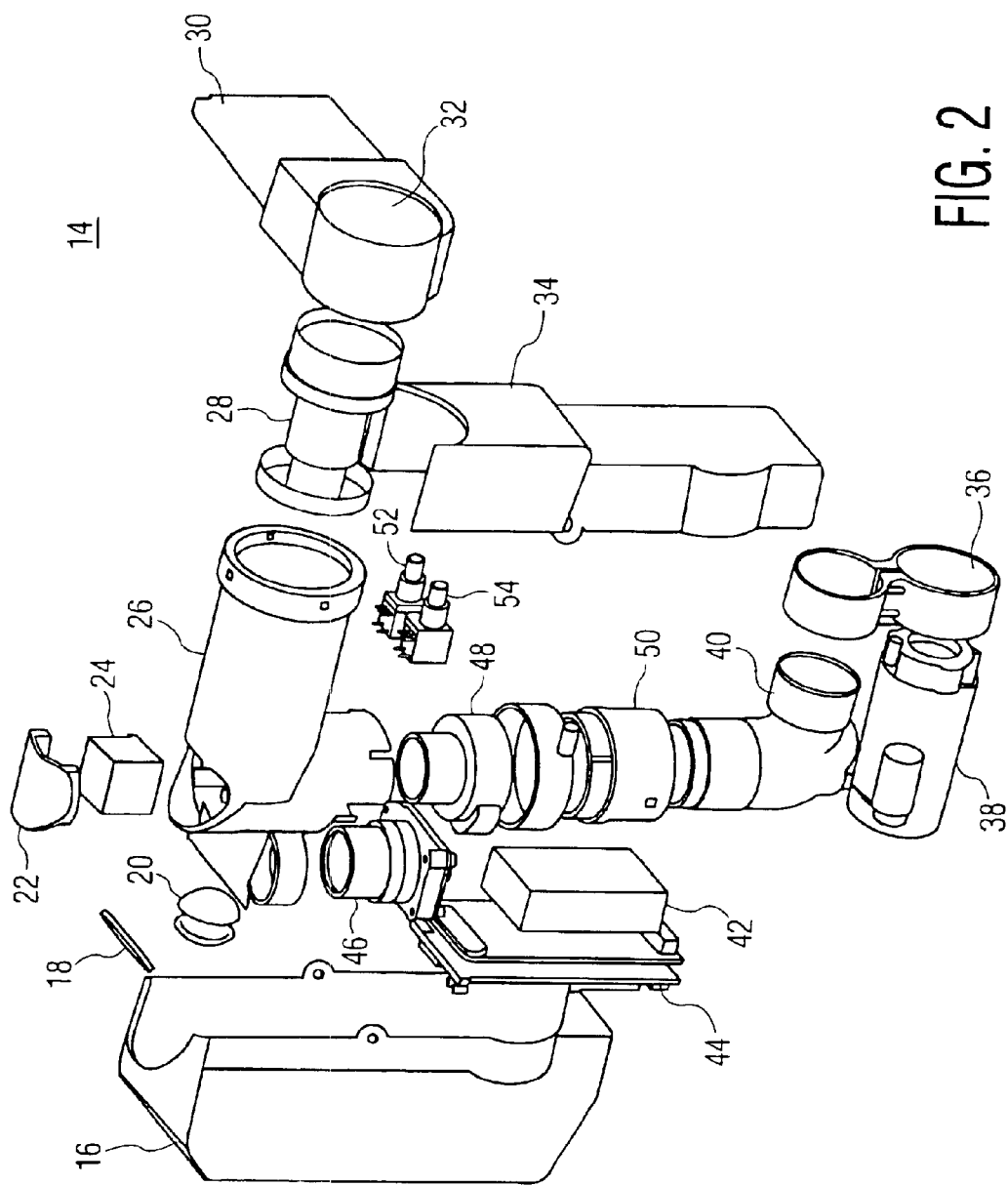
FIG. 2 is an exploded view of an optical assembly of the night vision system shown in FIG. 1, in accordance with an embodiment of the present invention.

Referring to both, FIGS. 1 and 2, each optical assembly 14 includes image intensifier ($I^2$) objective assembly 40, which collects visible scene light for image intensification and infrared (IR) objective assembly 38, which collects infrared scene light for conversion into a visible image on a flat panel display (FPD). As shown, the $I^2$ objective assembly and the IR objective assembly are oriented along the cheek of the viewer and collect substantially similar images of a scene.

$I^2$ objective assembly 40 includes a 90° bend for folding image light that enters the objective assembly at a substantially horizontal direction into a substantially vertical direction and bringing the folded light to image intensifier 48. The image intensifier receives the folded light and intensifies it at a predetermined narrow band of wavelengths. The output light from the image intensifier produces a visible band of light, known as P-43 light.

IR objective assembly 38 is aligned to $I^2$ objective assembly, by way of holding bracket 36, and is effective in producing an electronic image of a scene on a micorbolometer. The electronic image is processed by a processing circuit on board 44 and powered by battery supply 42. The processed image is displayed on an FPD disposed at the bottom portion of FPD magnifier 46 (not shown in FIG. 1). The magnified image, which is displayed substantially in a horizontal direction, is folded 90° by mirror 18 and then relayed through lenses 20 to beam combiner 24.

Beam combiner 24 is positioned to receive images from two channels. A first channel includes the optical path taken by the IR image through IR objective assembly 38, FPD magnifier 46, mirror 18 and lenses 20. A second channel includes the optical path taken by the visible image through $I^2$ objective assembly 40 and image intensifier 48. Beam combiner 24 combines the visible ($I^2$) and IR images, and provides both to collimator 28.

As shown, collimator 28 is oriented horizontally and substantially parallel to $I^2$ objective assembly 40 and IR objective assembly 38. The light inputted to collimator 28 is collimated into parallel beams of light and projected toward planar optic assembly 32, including planar diffractive relay 30. The planar diffractive relay may be a thin plate having a substantially planar cross-section. As will be explained, the planar diffractive relay internally reflects the incoming light rays as they strike each opposing surface of the plate. In this manner, the light rays are propagated from an input end of the plate (adjacent the collimator) toward an output end of the plate (adjacent the viewer's eye). As best shown in FIG. 1, planar diffractive relay 30 is oriented perpendicularly to the projected lines-of-sight of collimator 28, $I^2$ objective assembly 40 and IR objective assembly 38, and is horizontally aligned between the viewer's eye and collimator 28.

Although not shown in FIGS. 1 and 2 (but explained below), a first diffractive optical element (DOE) may be positioned between the input end of relay 30 and collimator 28. The first DOE may convert parallel light rays projected by collimator 28 into a converging light bundle, and may also bend the converging light rays by approximately 90°, with respect to the projected line-of-sight of collimator 28. The bent light rays (bundles) may be projected down the thin planar cross-section of relay 30. A second DOE may be positioned between the output end of relay 30 and the viewer's eye. The second DOE may take diverging light rays propagating down planar relay 30 and bend them a second time by approximately 90° from the direction of propagation. The light rays bent the second time may also be converted into parallel (collimated) light rays by the second DOE for viewing.

To complete description of FIG. 2, housing 26 is adapted to receive collimator 28, beam combiner 24, mirror 18, lenses 20, FPD magnifier 46 and image intensifier 48. Cover plate 22 prevents extraneous light from impinging on beam combiner 24. Tubular housing 50 is adapted to receive $I^2$ objective assembly 40 and image intensifier 48. Housing covers 16 and 34 are adapted to enclose the various components of optical assembly 14. Also shown are switch 52 (for example) which may provide an on/off control of the IR sensor circuits, and switch 54 (for example) which may provide image intensity control of the $I^2$ channel.

Figure 3:
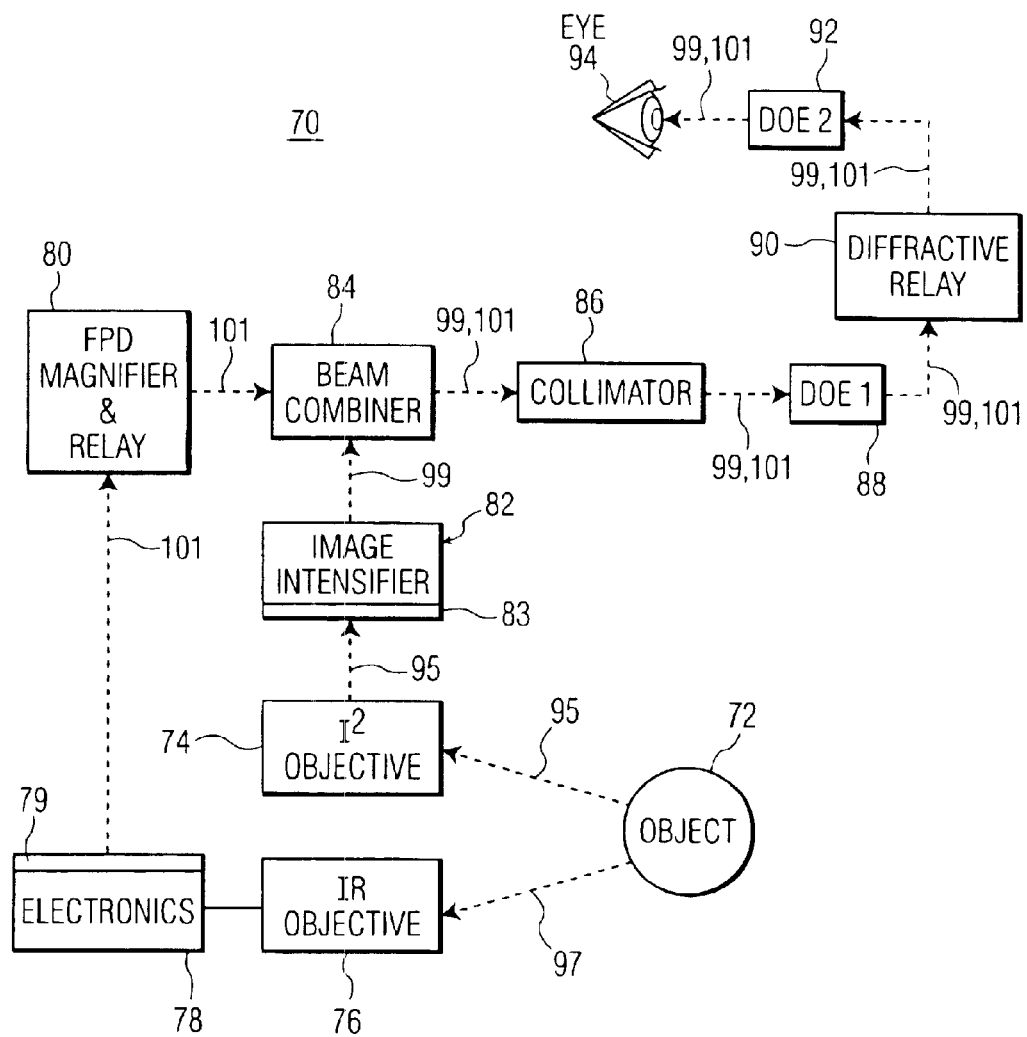
FIG. 3 is a schematic representation of an optical system, in accordance with an embodiment of the present invention.

Referring now to FIG. 3, there is shown a schematic representation of optical assembly 14, designated as optical system 70, in accordance with an embodiment of the invention. Visible light rays 95 and FIR (far-infrared) light rays 97 are reflected and emitted, respectively, from object 72. $I^2$ objective assembly 74 images light rays 95 onto photocathode 83 of image intensifier 82. The image is intensified at the output face of the image intensifier as light rays 99.

FIR light rays 97 enter IR objective assembly 76 and are processed by electronic circuit 78 to form a visible image on FPD 79. Light rays 101, emitted from FPD 79, is magnified and relayed toward beam combiner 84 by way of FPD magnifier and relay 80.

Light rays 99 and 101 are combined by beam combiner 84 and sent to collimator 86. It will be appreciated that light rays 99 and 101 may each be alternatively formed from a CRT, a laser scanner, an image tube, or a projected image source. These image sources may be displayed on a flat panel or a curved panel.

Light rays 99 and 101 may be converted from diverging light rays into parallel light rays by collimator 86. After being projected by collimator 86, the light rays may enter, in sequence, first DOE 88, planar diffractive relay 90 and second DOE 92. As will be explained, first DOE 88 may be disposed at the input end of relay 90 and second DOE 92 may be disposed at the output end of relay 90. As will also be explained, the combination of the first and second DOEs and relay 90 is effective in redirecting the propagation direction of light rays 99 and 101 by approximately 180°, as the light rays travel from collimator 86 toward the viewer's eye 94. It will further be appreciated that in alternative embodiments either the first DOE or second DOE may be eliminated.

Figure 4:
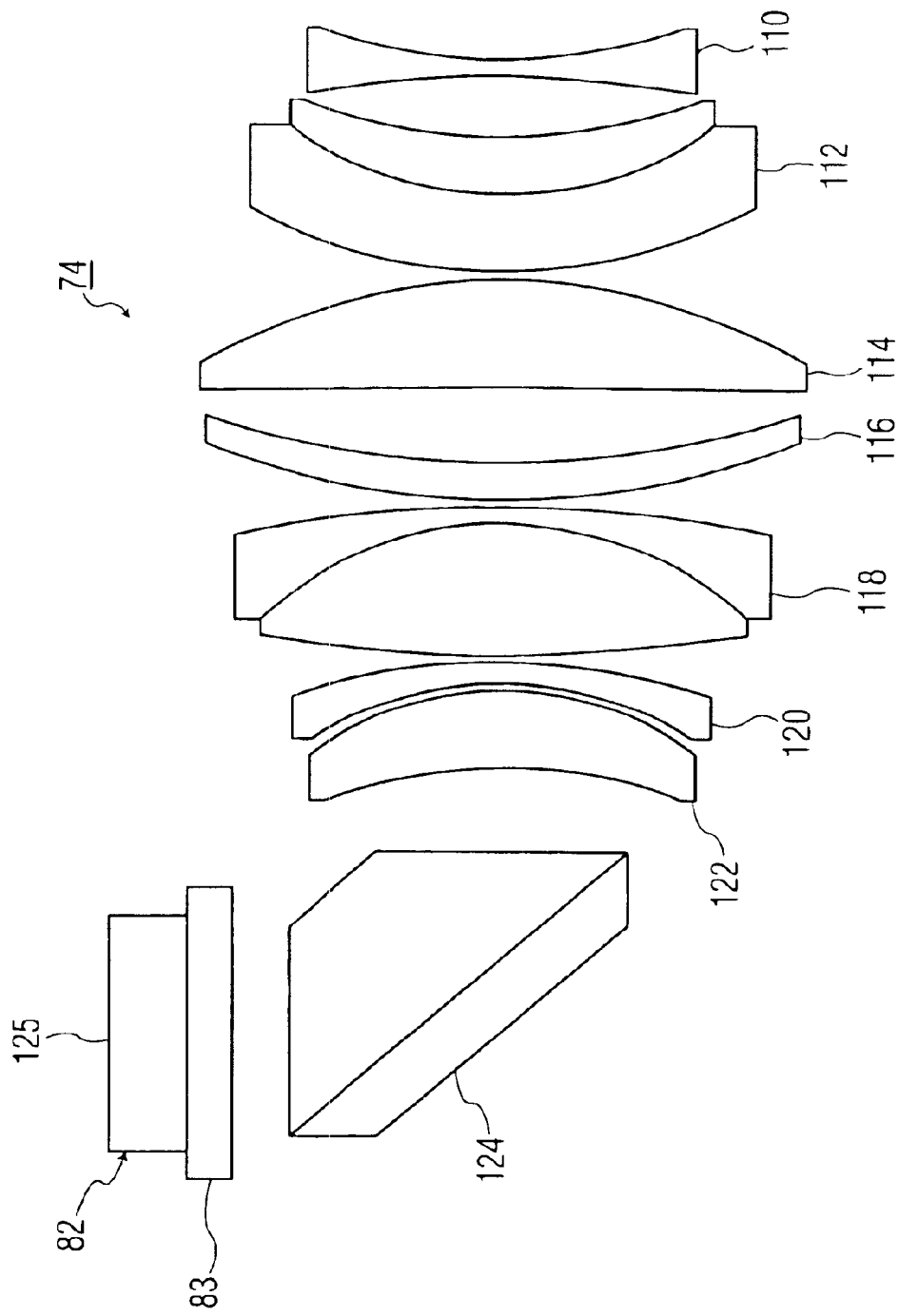
FIG. 4 is a planar view of an image intensifier ($I^2$) objective assembly illustrating various lenses which focus and fold a night image onto an image intensifier, in accordance with an embodiment of the present invention.

Components of optical system 70, shown schematically in FIG. 3, will now be described by reference to FIGS. 4–6. Referring first to FIG. 4, there is shown $I^2$ objective assembly 74. As shown, the $I^2$ objective includes several spherical and/or aspherical lenses, typically made of glass, which focus and provide a 90° fold to light rays entering at lens 110 and exiting at roof prism 124. The $I^2$ objective assembly has a high aperture of F/1.25 and a field-of-view of substantially 40° on a 16 mm format. The lenses may be moved in relation to each other to provide a variable focus range from 25 cm to infinity.

In the embodiment shown in FIG. 4, the $I^2$ objective assembly includes five single lenses, two double lenses and roof prism 124. On the input side of roof prism 124, there is shown, in sequence, singlet 110, doublet 112, singlet 114, singlet 116, doublet 118, singlet 120 and singlet 122. Prism 124 provides a 90° fold for the light rays entering the objective assembly.

A specific construction of an embodiment of $I^2$ objective assembly 74 of the present invention is described by referring to FIG. 4 in combination with FIGS. 16A through 16C. As one skilled in the art may ascertain, FIGS. 16A–16C are Zemax prescription data including surface details of the objective assembly, lens data, radius data, thickness, aperture radius, wavelength data, refractive indices data, and general operating condition data for the overall arrangement of the objective lens assembly. It will be appreciated that the reference designations, shown in FIGS. 16B and 16C, under the column titled "Comment", correspond to the reference designations of lenses shown in FIG. 4, for example. Object 72 is shown in FIG. 3, for example.

FIG. 4 also shows image intensifier 82 operating to intensify an image formed by $I^2$ objective assembly 74 on photocathode 83. The photocathode is disposed at an input face of image intensifier 82. The image intensifier converts the image formed at the input face into a one-to-one mapping of visible light formed at its output face 125.

Figure 5:
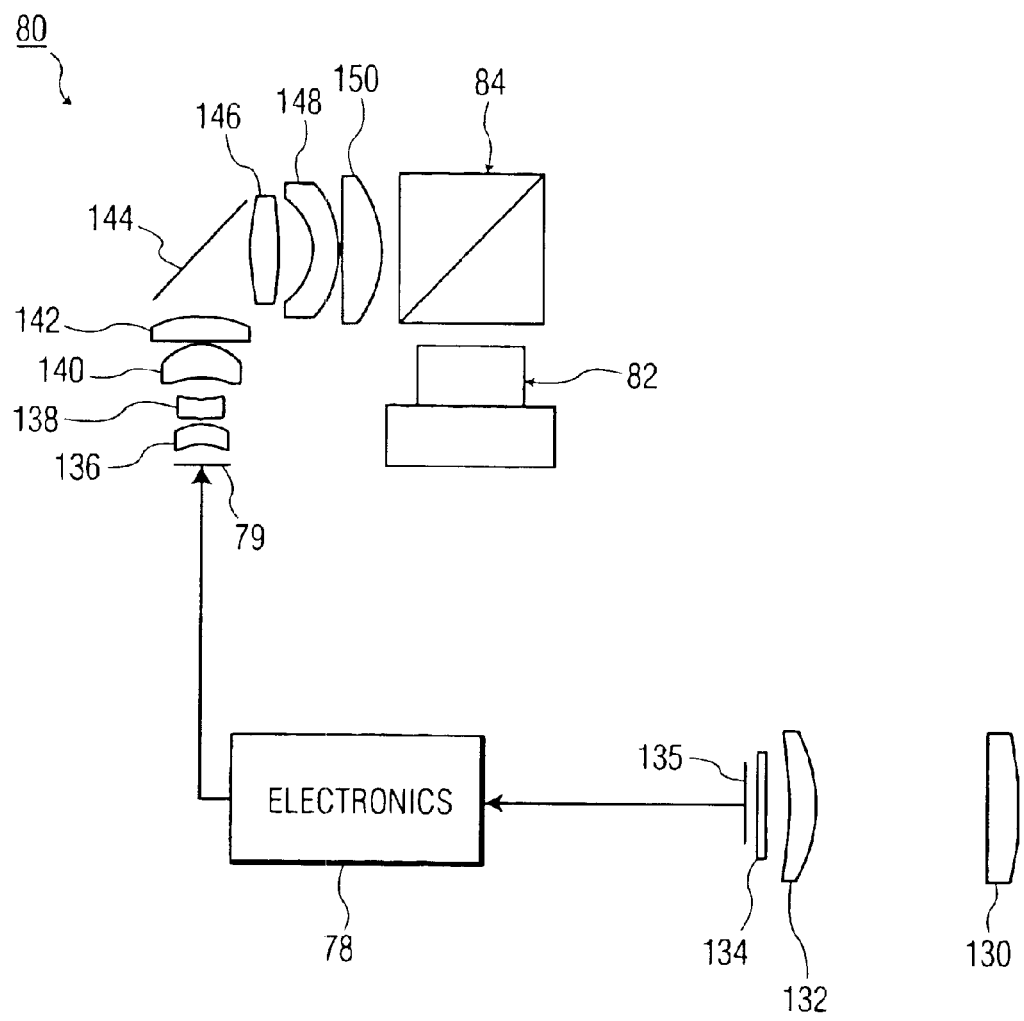
FIG. 5 is a schematic representation of an infrared (IR) channel depicting a planar view of various lenses for focussing an infrared (IR) image onto a micro-bolometer, and for magnifying and relaying the IR image from a flat panel display (FPD), in accordance with an embodiment of the present invention.

Turning next to the IR channel, various lenses for focussing, magnifying and relaying the incoming IR light rays are shown in FIG. 5. As shown, IR objective 76 includes lenses 130 and 132 which forms an image through window 134 onto micro-bolometer 135. The image is processed by electronic circuit 78 to form a visible image on FPD 79. Lenses 130 and 132 may be fixed to project an image at infinity. The IR objective includes a field-of-view of substantially 30° on a 16 mm format.

The image formed on FPD 79 is magnified and relayed by FPD magnifier and relay 80 toward beam combiner 84. FPD magnifier and relay 80 includes seven single lenses and a 90°-fold mirror 144. On the entrance side of mirror 144, there is shown, in sequence, singlet 136, singlet 138, singlet 140 and singlet 142. On the output side of mirror 144, there is shown, in sequence, singlet 146, singlet 148 and singlet 150.

A specific construction of an embodiment of IR objective 76 of the present invention is described by referring to FIG. 5 in combination with FIGS. 17A and 17B. As one skilled in the art may ascertain, FIGS. 17A–17B are Zemax prescription data. It will be appreciated that the reference designations, shown in FIG. 17B, under the column titled "Comment", correspond to the reference designations of lenses shown in FIG. 5, for example. Object 72 is shown in FIG. 3, for example.

A specific construction of an embodiment of FPD magnifier and relay 80 is described by referring to FIG. 5 in combination with FIGS. 18A through 18I. As one skilled in the art may ascertain, FIGS. 18A–18I are Zemax prescription data. The data are not only prescription data of FPD magnifier and relay 80 (FIG. 5, for example), but also includes prescription data of beam combiner 84, collimator 86, planar relay 90 and DOEs 88 and 92 (as shown in FIG. 6, for example). It will be appreciated that the reference designations, shown in FIGS. 18B–18D, under the column titled "Comment", correspond to the reference designations of lenses shown in FIGS. 5 and 6, for example. Object 94 (viewer's eye) is shown in FIG. 3, for example.

Figure 6:
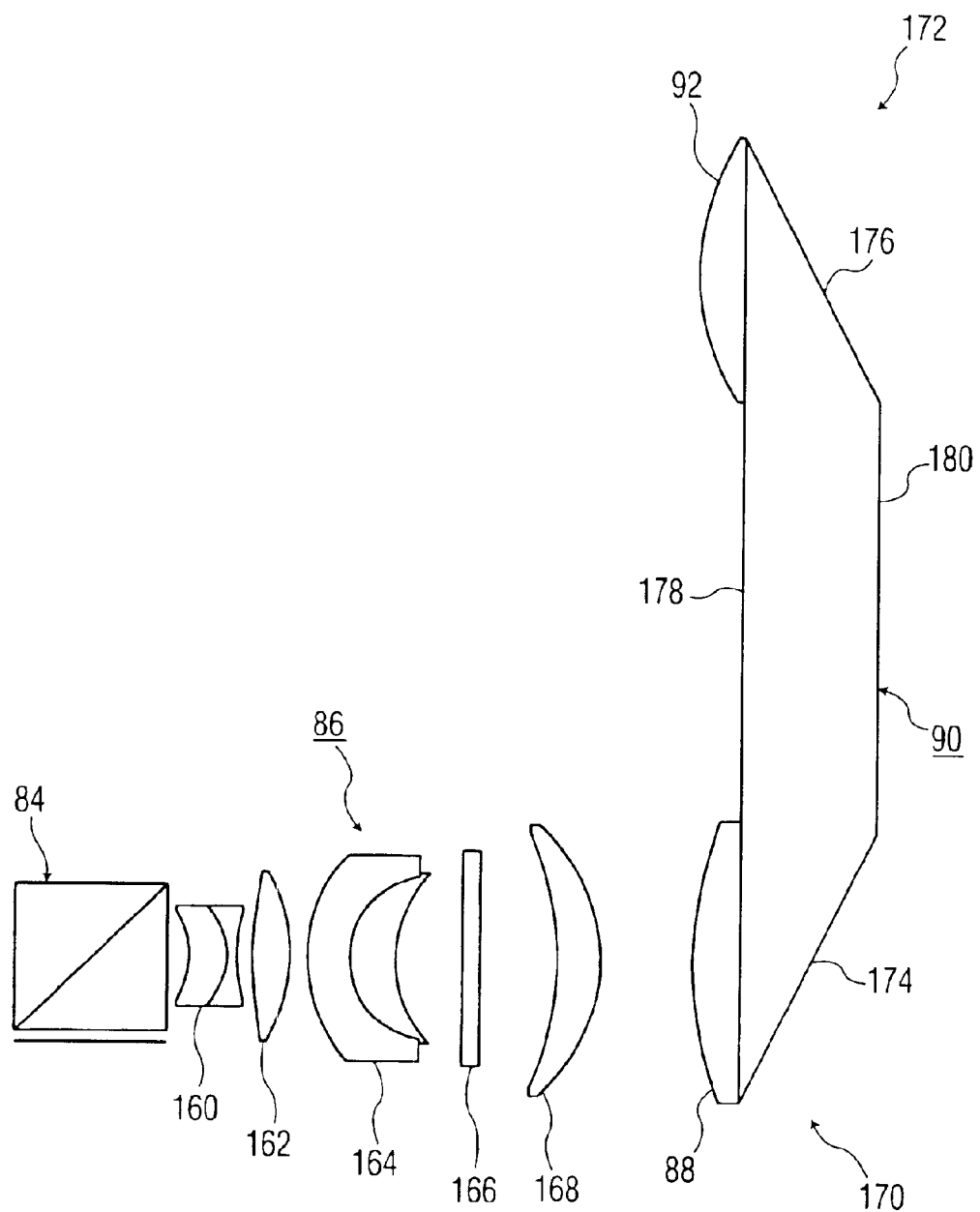
FIG. 6 is a planar view of various lenses forming a collimator assembly for projecting collimated light onto a planar diffractive relay, in accordance with an embodiment of the present invention.

Turning now to FIG. 6, there is shown collimator 86 disposed between beam combiner 84 and planar diffractive relay 90. As shown, collimator 86 is common to the $I^2$ channel and the IR channel, and is adapted to convert diverging light (specular or diffuse) from any source into collimated light. The source may be an FPD, a CRT, a laser scanner or an image tube. In the embodiment shown in FIGS. 4–6, the sources include FPD 79 and photocathode 83.

Collimator 86 includes five lenses. As shown, doublet lens 160 is positioned adjacently to beam combiner 84, and singlet lens 168 is positioned adjacently to first DOE 88.

Between lenses 160 and 168, there is shown, in sequence, singlet lens 162, doublet lens 164 and singlet lens 166. A specific construction of an embodiment of collimator 86 is described by referring to FIG. 6 in combination with FIGS. 18A–18I.

Also shown in FIG. 6 is planar diffractive relay 90, which may be made of optically transparent material, including glass, crystal or plastic. Planar diffractive relay 90 may be approximately the size of a microscope slide, for example 5 mm thick×80 mm long×30 mm wide. The thickness of planar diffractive relay 90 may vary from 5 mm to 20 mm. As best shown in FIG. 1 (referenced as relay 30), planar relay 90 is disposed directly in front of the viewer's eye. Because the planar relay may be very thin and the collimator may be oriented along the cheek of the viewer, the present invention achieves an optical system having a forward projection (as measured from the eyeball) of less than 45 mm. A conventional optical system typically includes a is forward projection of 160 mm (as measured from the eyeball).

As will be explained, the optical paths, in addition to planar diffractive relay 90, may include first DOE 88 disposed at input end 170 and second DOE 92 disposed at output end 172. As will also be explained, first DOE 88 redirects light projected from collimator 86 toward planar relay 90 and second DOE 92 redirects light propagating within planar relay 90 toward the eye of the viewer.

Planar relay 90 includes planar surfaces 178 and 180 substantially parallel to each other. At input end 170, planar surfaces 178 and 180 terminate at angled (or tilted) surface 174. At output end 172, planar surfaces 178 and 180 terminate at angled (or tilted) surface 176. In one embodiment of the invention, angled surfaces 174 and 176 may each be coated with a reflective material, so that each may behave as a reflector to incident light. The reflective material may be deposited by an evaporation process with a typical thickness of about five microns.

A specific construction of an embodiment of planar relay 90, first DOE 88 and second DOE 92 are shown in FIG. 6 in combination with FIGS. 18A through 18I. As one skilled in the art may ascertain, FIGS. 18A–18I are Zemax prescription data and include prescription data of the following visual optic train: FPD magnifier and relay 80 (FIG. 5), beam combiner 84, collimator 86, DOE 88, planar relay 90, and DOE 92 (as shown in FIG. 6, for example).

Figure 7:
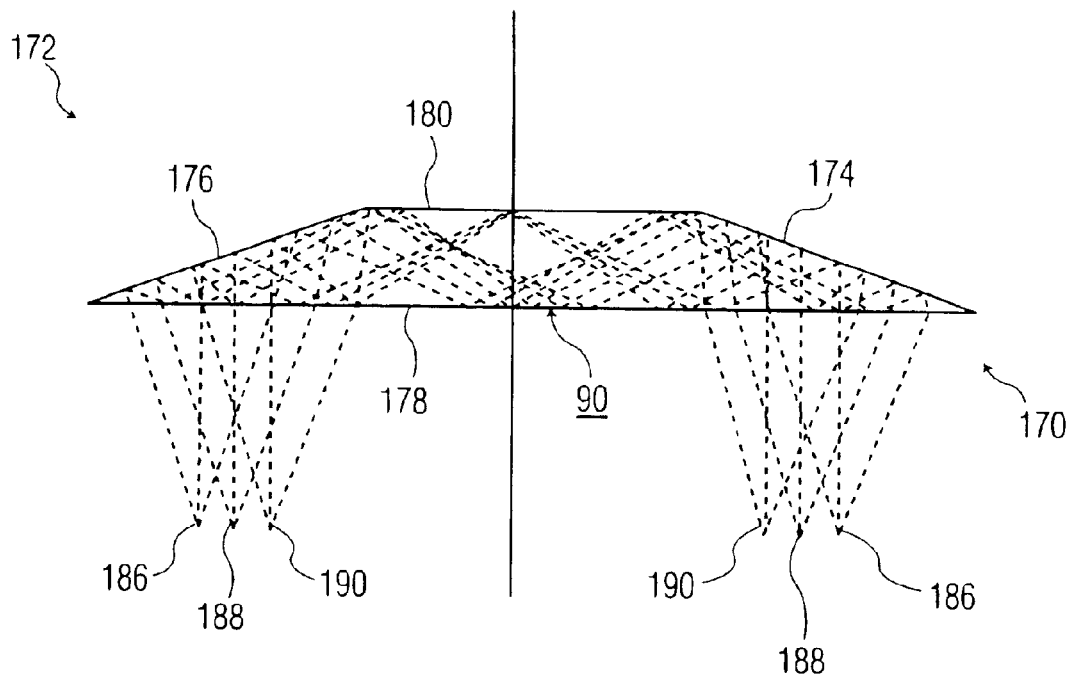
FIG. 7 is an illustration of three light rays entering, propagating through and exiting a planar diffractive relay, in accordance with an embodiment of the present invention.

Referring now to FIG. 7, three light rays 186, 188 and 190 are shown entering, propagating through and exiting planar relay 90. The three light rays (+20, 0 and −20 degrees field-of-view), after being converted into parallel light rays by collimator 86 (FIG. 6), enter planar relay 90 at input end 170. The three light rays are first directed to strike reflector surface 174, then are reflected off the surface to undergo substantially total internal reflection (TIR) within planar relay 90. The three light rays are reflected sideways to the original direction of propagation. The light rays propagate through the length of planar relay 90, as they bounce back and forth off planar surfaces 178 and 180. At the output end, the light rays strike reflector surface 176 and are reflected in a direction opposite to the direction the light rays originally entered the planar relay. The light rays exit the planar relay at output end 172 and form a pupil which is used by an external device, such as a viewer's eye, camera or video camera/sensor. It will be appreciated that the path of the light rays shown in FIG. 7 are actually perpendicular to the page but, for ease of illustration, are shown in the plane of the page.

Figure 8:
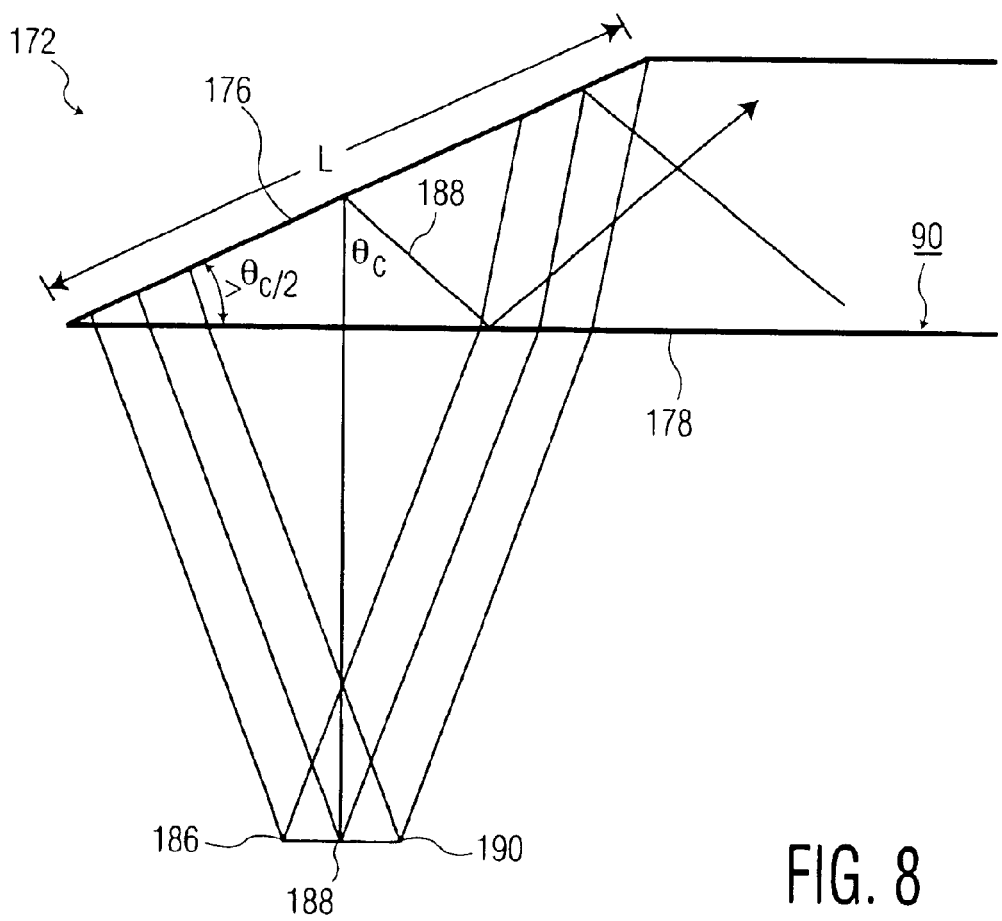
FIG. 8 is an illustration of three light rays striking on and reflecting from a reflector surface of a planar diffractive relay, in accordance with an embodiment of the present invention.

Reflector surfaces 174 and 176 each forms an angle greater than $$\frac{\Theta_c}{2}$$

degrees with planar surface 178, as best shown in FIG. 8. It will be appreciated that $\Theta_c$ is defined as a critical angle that provides total internal reflection for light ray 188 (for example) as it strikes planar surface 178 (for explanation purpose the light ray is shown directed toward the input end of planar relay 90). It will also be appreciated that a similar angle may be formed between reflector surface 174 and planar surface 178 (FIG. 7). Furthermore, $\Theta_c$ is a theoretical angle, as a true total internal reflection is not achievable. Typically, losses of less than 10% and preferably less than 1% may be tolerated and may be included in the phrase 'a substantially total internal reflection.'

While reflector surface 176 subtends an angle that is greater than $$\frac{\Theta_c}{2}$$

degrees with planar surface 178, the size of the angle is limited, however, to allow the length (L) of reflector surface 176 to be sufficiently long to cover the full field-of-view of the light rays entering and exiting planar relay 90. In this manner, the light rays at input end 170 and output end 172 may strike input reflector surface 174 and output reflector surface 176 only once.

In the embodiment shown in FIGS. 6–8, planar relay 90 substantially confines the light rays within its planar cross-section by the principal of total internal reflection. No light ray may escape whose slope angle is greater than arcsin $$\left(\frac{1}{N}\right),$$

where N is the refractive index of the planar relay. This angle may vary between 42 degrees for BK-7 glass (N approximately 1.5) and 33 degrees for SFL-57 glass (N approximately 1.85), for example.

In another embodiment, planar relay 90 may be made of two parallel reflective plates (for example 178 and 180) which form a hollow space between the plates. The medium in the hollow space may be air.

Various embodiments of a diffractive optical element (DOE) for placement at input end 170, output end 172 or both input and output ends of planar relay 90 will now be described.

At the input end, a DOE converts the parallel light rays from collimator 86 into a converging bundle of light. For example, three light rays (+20, 0 and −20 degrees field-of-view) are refracted to become a narrower bundle (for example +10.7, 0 and −10.7 degrees, if the refractive index is 1.85). As the light rays bend (approximately 90 degrees with respect to the collimator's projected line-of-sight) and propagate through the thin cross-section of planar relay 90, an intermediate image is formed within the planar relay.

It will be appreciated that the DOE at the input end of planar relay 90 includes characteristics to form the intermediate image, which reduces the overall dimensions of the planar relay. The DOE may be placed on planar surface 178 (as shown by DOE 88 in FIG. 6, for example) or on angled (tilted) surface 174 (explained below). When placed on tilted surface 174, the DOE effectively reduces the amount of deflection angle through which the DOE must work to diffract and bend the light. The tilted surface also allows the DOE to work in a region in which an incident parallel ray bundle may subtend an angle of +/− 10 degrees before extinction.

At the output end, a DOE converts the diverging light bundle propagating through planar relay 90 into a parallel or collimated light for presentation to the viewer's eye. It will be appreciated that, after the intermediate image is formed within planar relay 90, the light bundle begins to diverge, the DOE at the output end, therefore, converts the diverging light bundle into collimated light. The DOE may be placed on planar surface 178 (as shown by DOE 92 in FIG. 6, for example) or on angled (tilted) surface 176 (explained below). When placed on tilted surface 176, the DOE effectively reduces the amount of deflection angle through which the DOE must work.

As will be explained, the DOE (at the input end or output end) may be a non-linear, unsymmetrical diffractive grating. The grating may be of on-axis type or off-axis type, and may be transmissive or reflective in nature.

Figure 9:
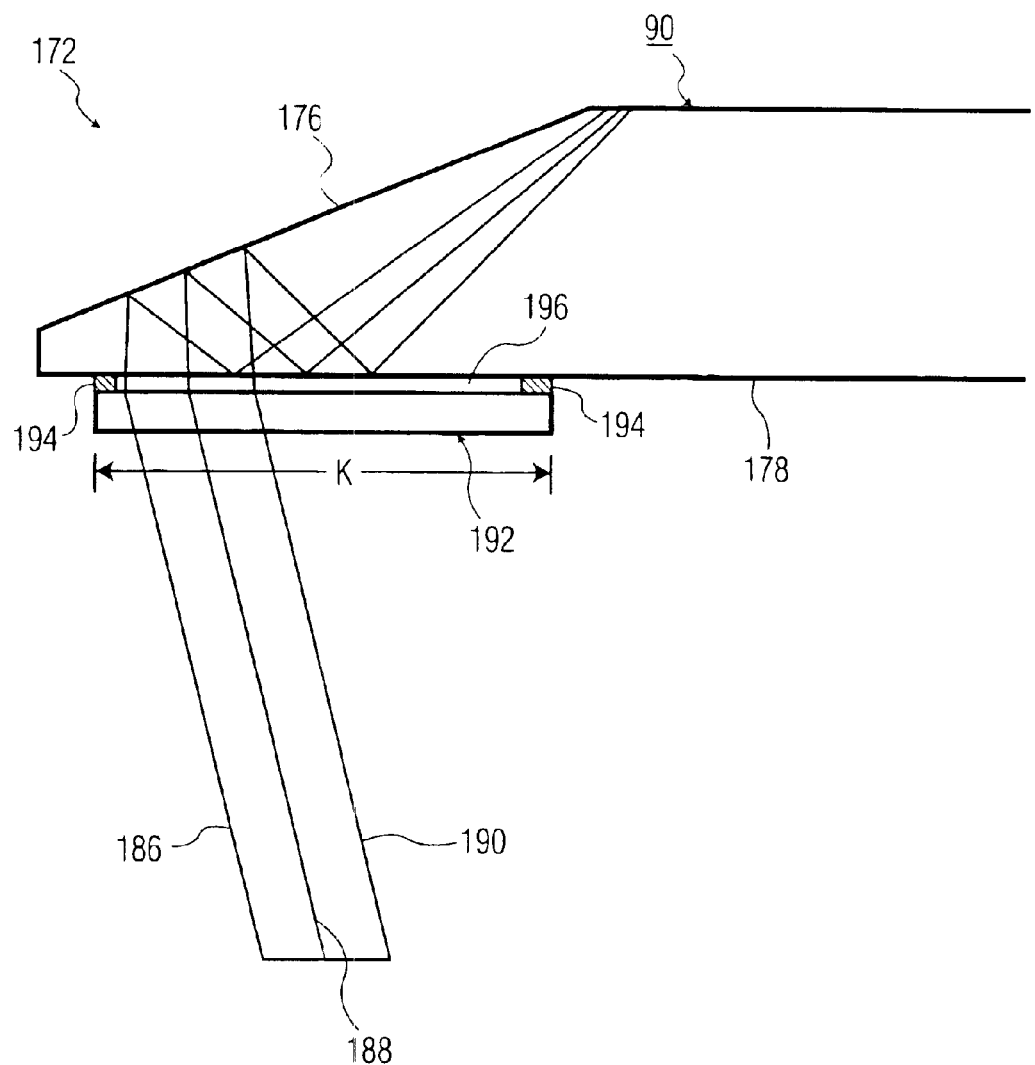
FIG. 9 is an illustration of three light rays entering and exiting a Kinoform type of diffractive lens, which is positioned adjacent to an output end of a planar diffractive relay, in accordance with an embodiment of the present invention.

One embodiment of a DOE is shown in FIG. 9. As shown, DOE 192 may be a Kinoform-type of diffractive lens. The Kinoform lens may include, for example, a diameter K of 30 mm and a cross-sectional thickness of 5 mm. The Kinoform lens may be bonded to planar surface 178 with epoxy 194, such as Norland No. 61 or an equivalent. A closed air-space 196 may be formed by planar surface 178, epoxy 194 and Kinoform lens 192. The air-space may be 0.1 mm in the thickness dimension.

Figure 10A:
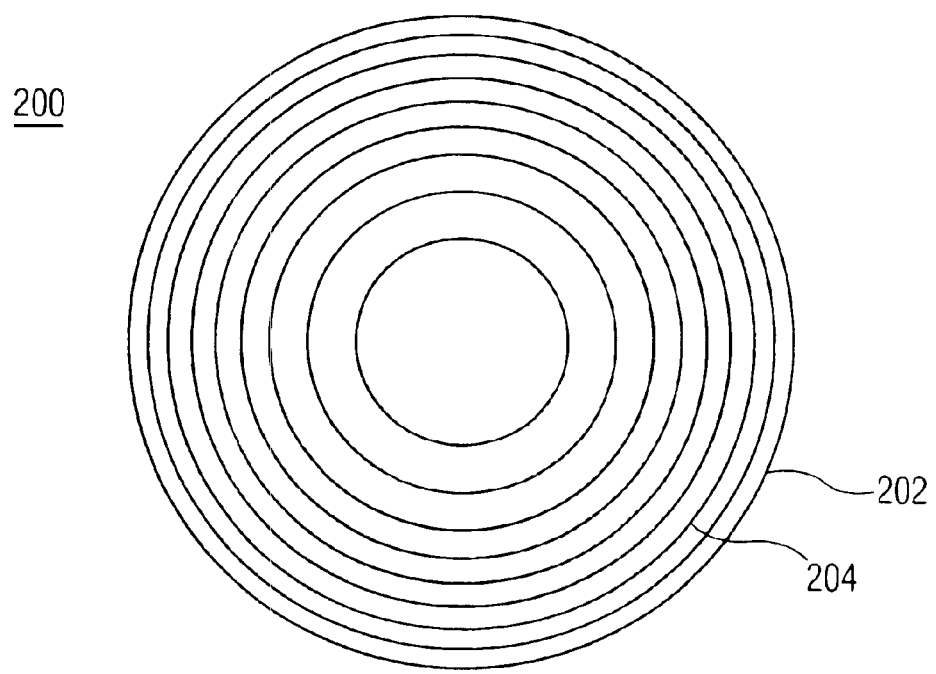
FIGS. 10A and 10B are planar views of holograms formed in diffractive optical elements (DOEs) used in accordance with various embodiments of the present invention.

The Kinoform lens may be fabricated by precision machining or molding in a conventional manner so that each of the surfaces between major steps (not shown) is continuous. A planar view of an on-axis type of grating (or hologram) that may be formed on a surface of the Kinoform lens is illustrated in FIG. 10A and is generally designated as 200. As shown in FIG. 10A, hologram 200 includes concentric circles (for example 202, 204) of constant phase. It will be appreciated that, between each two adjacent concentric circles, a continuous step-shaped surface may be fabricated to form the diffractive properties of the Kinoform lens.

When placed at output end 172 of planar relay 90, as shown in FIG. 9, Kinoform lens 192 collimates the diverging light rays (186, 188, 190), which are folded by reflector surface 176, into parallel light rays for presentation to the viewer's eye. When placed at the input end of planar relay 90 (not shown), Kinoform lens 192 converges the light rays projected from collimator 86 to form the intermediate image, which effectively reduces the overall size of the optics.

Figure 11:
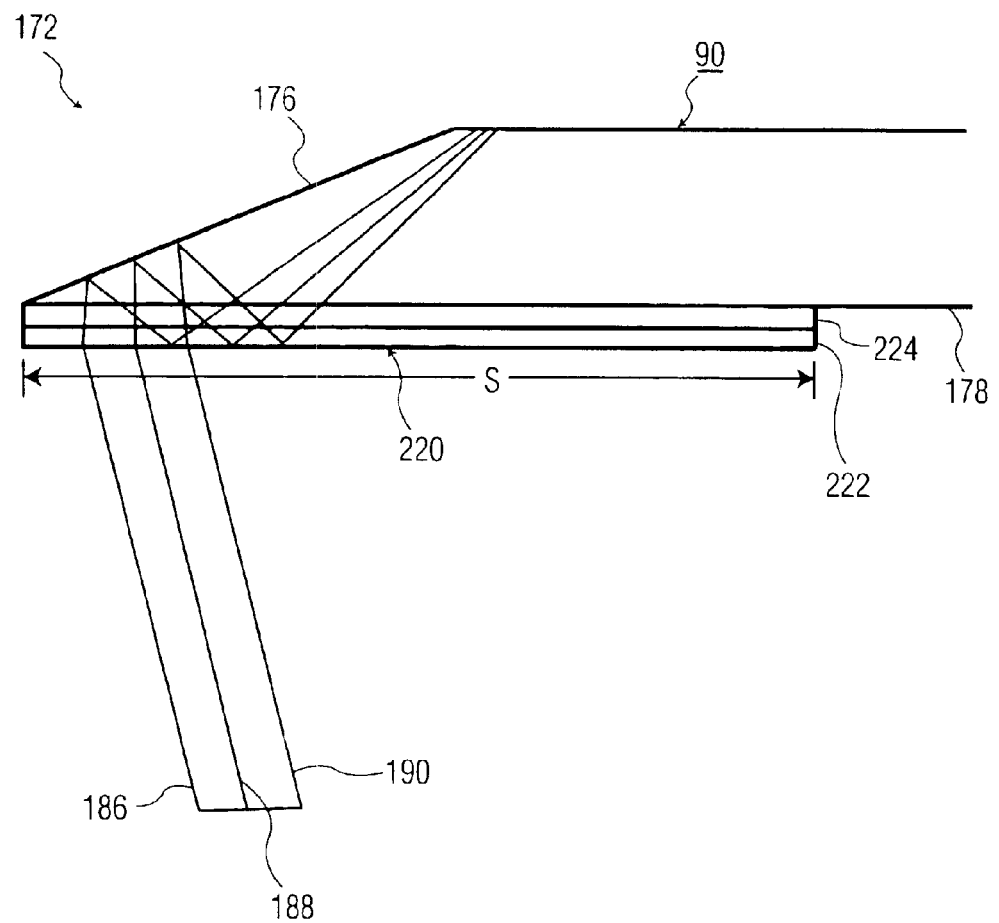
FIG. 11 is an illustration of three light rays entering and exiting a sandwiched holographic lens, which is positioned adjacent to an output end of a planar diffractive relay, in accordance with an embodiment of the present invention.

Another embodiment of a DOE is shown in FIG. 11. As shown, DOE 220 may be a sandwiched holographic lens, which includes hologram layer 222 and epoxy layer 224. The index of refraction of hologram layer 222 is matched to the index of refraction of epoxy layer 224. The sandwiched holographic lens may include, for example, a diameter S of 30 mm, and a cross-sectional thickness of 2.25 mm (hologram layer 222 may be 2.0 mm thick and epoxy layer 224 may be 0.25 mm thick). Epoxy layer 224 may be Norland No. 61 or an equivalent.

A planar view of hologram layer 222 is shown in FIG. 10A. As shown, the hologram (designated as 200 in FIG. 10A) includes concentric circles of constant phase and may be similar to the hologram described for the Kinoform lens. Similar to the Kinoform lens, the sandwiched holographic lens may be placed at input end 170 or output end 172 (FIG. 6) and may advantageously reduce the overall size of the optics.

Figure 12:
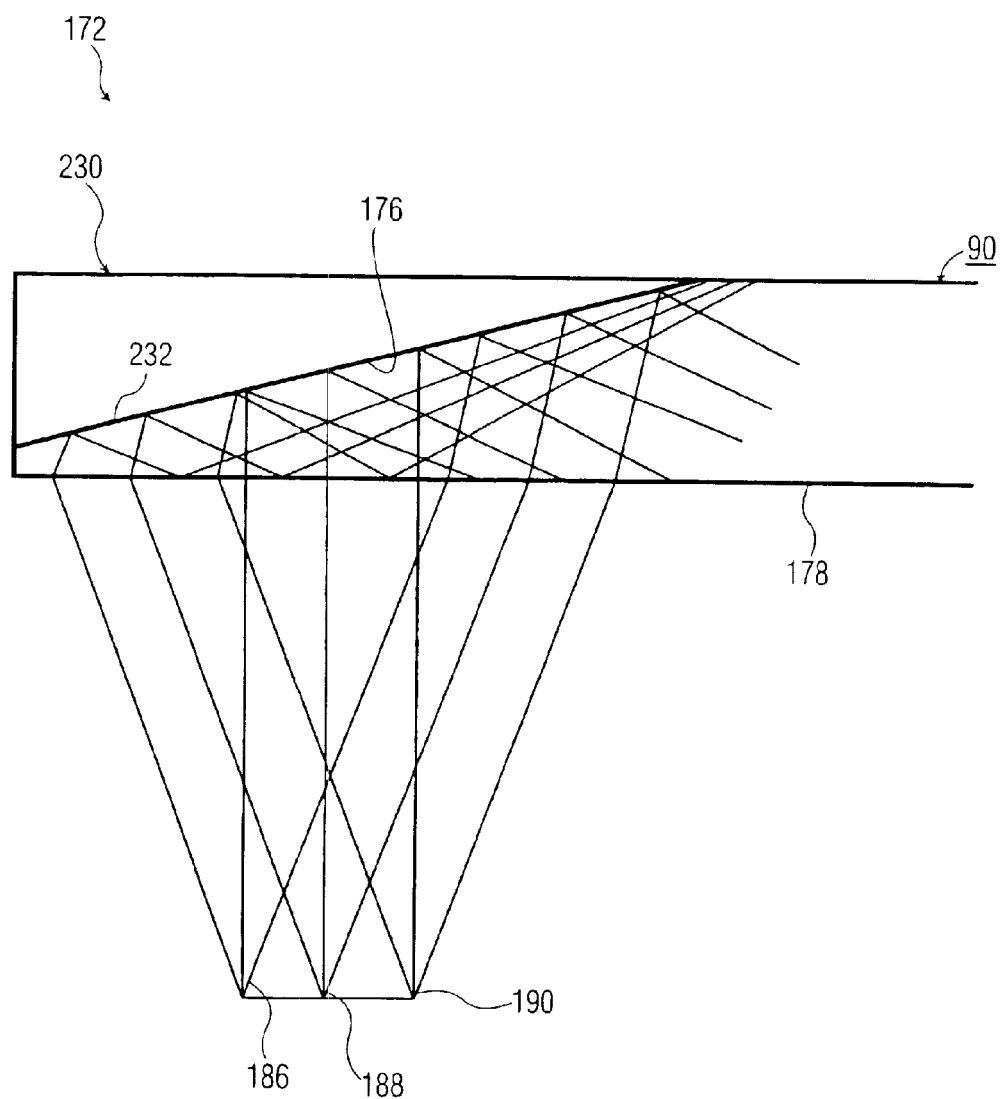
FIG. 12 is an illustration of three light rays striking on and reflecting from an off-axis transmission holographic lens, which is positioned adjacent to an output end of a planar diffractive relay, in accordance with an embodiment of the present invention.

Still another embodiment of a DOE is shown in FIG. 12. As shown, an off-axis transmission holographic lens 230 includes tilted surface 232, which is pasted onto tilted surface 176 of planar relay 90 at output end 172. Holographic lens 230 may include a holographic pattern recorded in a gelatin or polymer substrate (volume hologram).

Figure 10B:
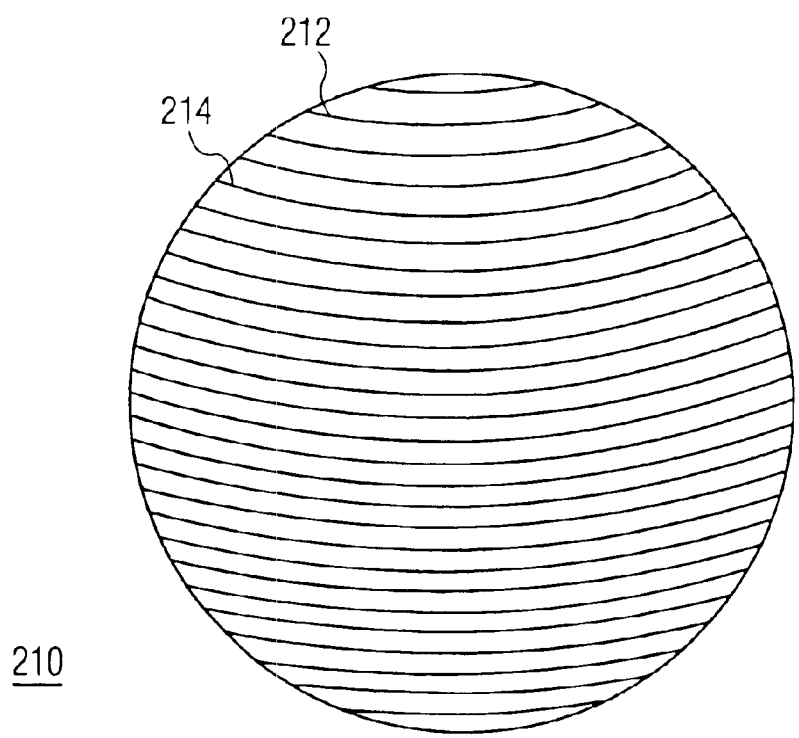

A planar view (viewed toward tilted surface 232) of an exemplary hologram recorded in holographic lens 230 is shown in FIG. 10B and is generally designated as hologram 210. Hologram 210 includes de-centered concentric circles of constant phase (for example, de-centered concentric circles 212, 214).

Figure 13:
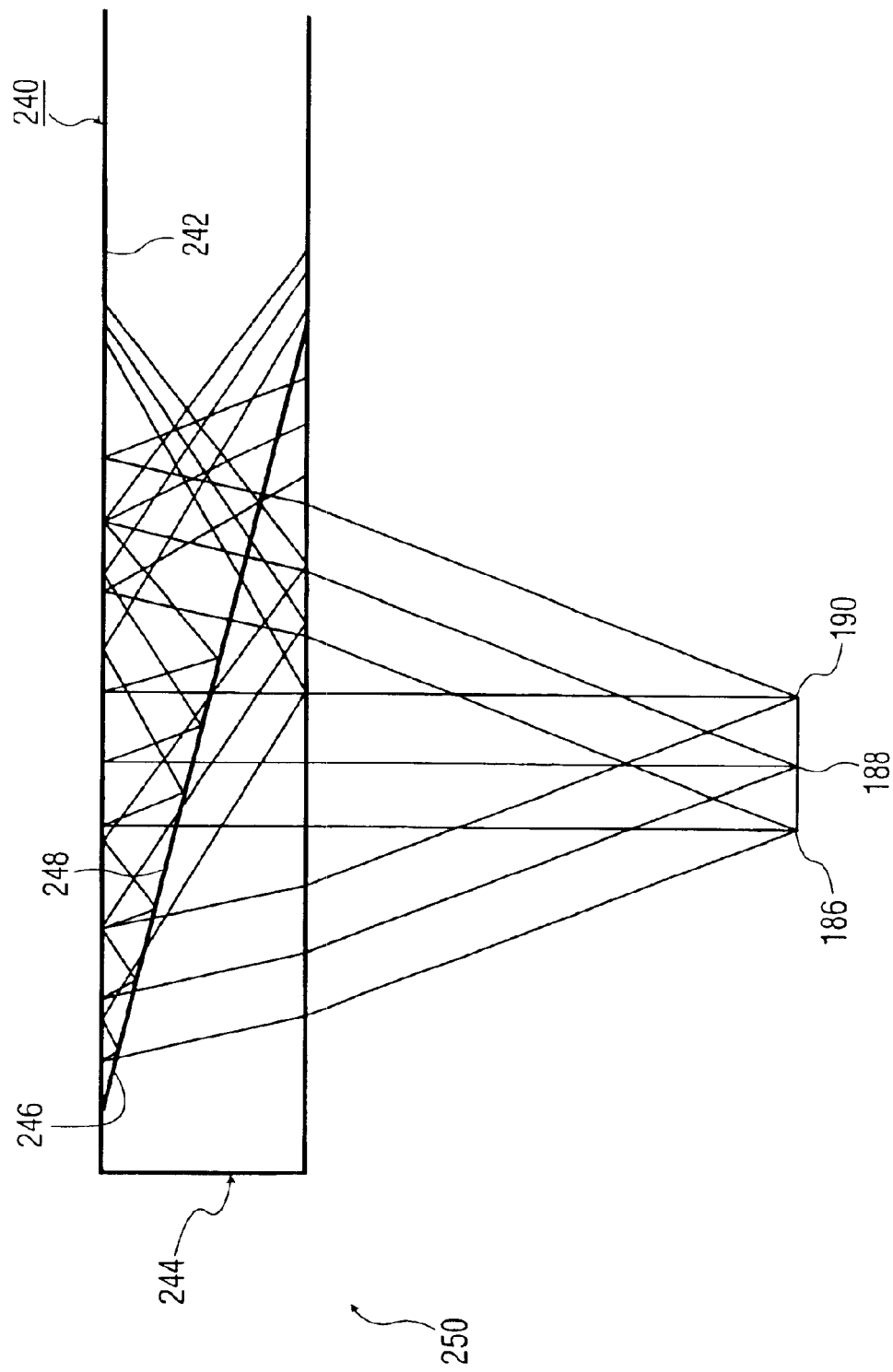
FIG. 13 is an illustration of three light rays entering and exiting an off-axis reflection holographic lens, which is positioned adjacent to an output end of a planar diffractive relay, in accordance with an embodiment of the present invention.

Yet another embodiment of a DOE is shown in FIG. 13. As shown, an off-axis reflection holographic lens 244 includes tilted surface 246, which is pasted onto tilted surface 248 of planar relay 240 at output end 250. Reflection holographic lens 244 may include a holographic pattern similar to hologram 210 of FIG. 10B, as viewed toward tilted surface 246. It is noted that the holographic pattern on tilted surface 246 reflects some light bundles (186, 188, 190) (diverging in planar relay 240) onto planar surface 242. The light bundles are then reflected from planar surface 242, and transmitted through holographic lens 244 toward the viewer's eye.

It will be appreciated that off-axis holographic lens 230 and off-axis holographic lens 244 may each be placed at the input end and output end of the planar relay.

Figure 14:
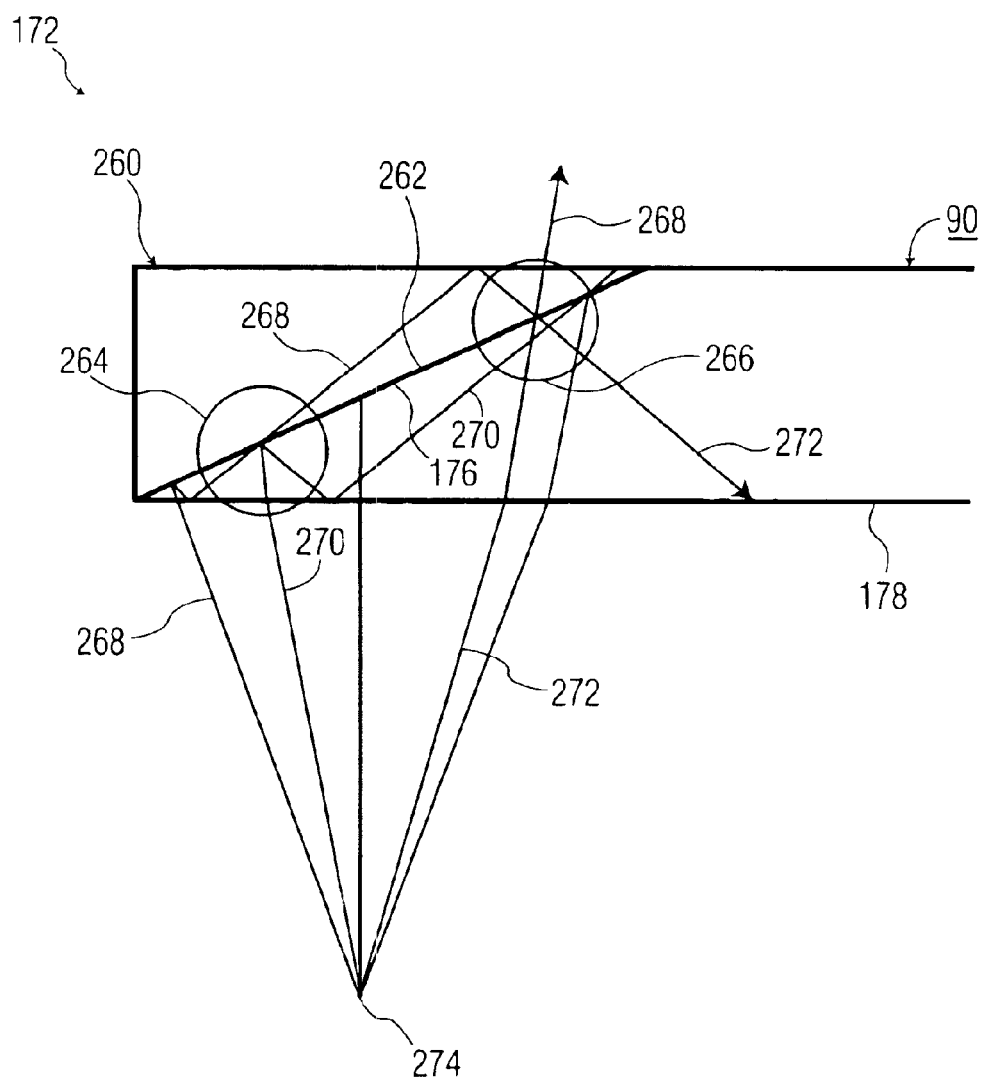
FIG. 14 is an illustration of a light ray passing through or reflecting off a Bragg reflector, which is positioned adjacent to an output end of a planar diffractive relay, in accordance with an embodiment of the present invention.

Another embodiment of a DOE is shown in FIG. 14. As shown, Bragg reflector 260 includes tilted surface 262, which is pasted onto tilted surface 176 of planar relay 90 at output end 172. Bragg reflector 260 includes a volume reflection hologram that may be an on-axis type (FIG. 10A) or off-axis type (FIG. 10B). As known in the art, the Bragg angle changes across the hologram. When the impinging light beam has an on-Bragg wavelength, the light beam is diffracted. When the impinging light beam has an off-Bragg wavelength, however, the light beam is transmitted through the surface. This is illustrated in FIG. 14 with three light beams originating from point source 274. Beam 268 is transmitted through tilted surface 262 as an off-Bragg wavelength at location 264 and is diffracted at an on-Bragg wavelength at location 266. Beam 270 and beam 272, however, strike tilted surface 262 as on-Bragg wavelengths at location 264 and 266, respectively, and are, consequently, diffracted, as shown.

It will be appreciated that Bragg reflector 260 provides a method for assuring that incident beams are diffracted only once as they impinge on tilted surface 262.

Figure 15:
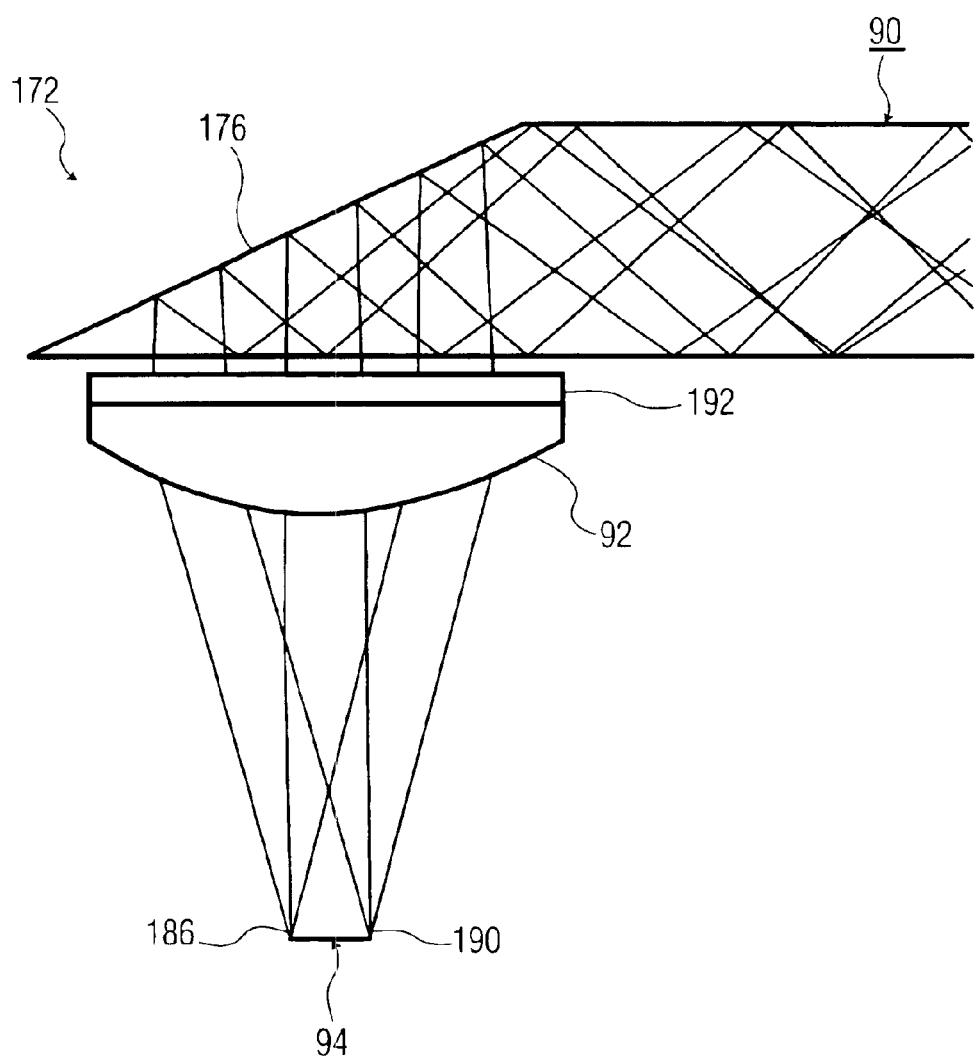
FIG. 15 is an illustration of light rays entering and exiting a combination of lenses including a Kinoform type of diffractive lens, which are positioned adjacent to an output end of a planar diffractive relay, in accordance with an embodiment of the present invention.

Yet another embodiment of a DOE is shown in FIG. 15. As shown, lens 92 (described, for example, in FIGS. 18A–18I) and Kinoform lens 192 are sandwiched together at output end 172 of planar relay 90. Although not shown, a similar combination of lenses may be formed at the input end of planar relay 90. The combined lenses diffract light beams 186 and 190, propagating through planar relay 90, into collimated light beams impinging on pupil 94.

The DOEs, illustrated in FIGS. 9–15, do not diffract light with the same efficiency. The diffraction characteristics of the DOE are dependent on the wavelength of light, the polarization of light, and the angle in which the light strikes the grating or hologram. Advantages of volume holograms (FIGS. 12–14) are that these holograms diffract in-band wavelengths and transmit out-of-band wavelengths (allow a see-through optical system). The Bragg reflector (FIG. 14) diffracts on-Bragg light waves and transmits the other light waves. The light may bounce multiple-times off the grating or hologram until the correct Bragg angle is encountered. In this manner, the Bragg reflector acts as a spatial filter, diffractng out only the correct wavelength. Other light continues to propagate and is absorbed, minimizing flare and stray light. Angular variation of Bragg angles across the grating at the output end (viewer's eye) may be optically fabricated. (Bragg angle variation at the input end, or collimator side, are more complex and difficult to fabricate).

Reasons for selecting a volume reflection hologram at the output end may include the following: A volume reflection hologram typically diffracts only to a single order and allows see-through. Because a volume reflection hologram allows multiple bounces for off-angle rays, a thinner planar relay may be used. A volume reflection hologram provides wider angular bandwidth (larger effective pupil), narrower spectral bandwidth (better see-through) and lower sensitivity to beam polarization (better efficiency) than a transmission volume hologram. A volume reflection hologram may also be fabricated holographically.

Reasons for selecting a blazed reflection grating (FIGS. 9–11) at the input end may include the following: A blazed reflection grating diffracts to a single order. Because of broad angular bandwidth, the need for varying the blazed angle across the grating is reduced. A blazed reflection grating may be fabricated by ruling with continuous tone or binary masks, or may be fabricated holographically.

It will be appreciated that the inventors have discovered that the chromatic aberration produced by the DOEs may be offset by chromatic aberration produced by the collimator. The DOEs produce negative chromatic aberration. In one embodiment of the invention, the refractive lenses of the collimator produce positive chromatic aberration, offsetting the negative chromatic aberration of the DOEs.

As described, the present invention need not be limited to night vision systems, but may be utilized in applications including a virtual reality viewer for computer generated images, in addition to the application of night vision devices for ground troops aviators and vehicle drivers.

It should be understood that the embodiments described herein are merely exemplary, and that a person skilled in the art may make variations and modifications without departing from the spirit and the scope of the invention. All such variations and modifications are intended to be within the scope of the invention as defined in the appended claims.

What is claimed is:

1. An optical system for directing light from an image source to a viewer's eye comprising:
   at least one image source providing an image source light,
   a collimator for receiving the image source light and converting the received image source light into a collimated light projected along a first optical path, and
   a planar diffractive relay mounted on a helmet including opposing planar surfaces longitudinally oriented substantially along a second optical path, the opposing planar surfaces terminating into an input tilted surface and an output tilted surface,
   wherein the collimated light projected along the first optical path is redirected by the input tilted surface as propagated light traveling in the second optical path,
   the propagated light traveling in the second optical path is redirected by the output tilted surface into a third optical path directed toward the viewer's eye, and
   an intermediate image of the image source is formed within the planar diffractive relay, and
   the intermediate image is substantially perpendicular to the opposing planar surfaces of the planar diffractive relay.

2. The optical system of claim 1 wherein the input tilted surface and one surface of the opposing planar surfaces subtend an angle greater than half of a critical angle for producing substantially total internal reflection of the propagated light traveling in the second optical path.

3. The optical system of claim 2 wherein the output tilted surface and the one surface subtend an angle greater than half the critical angle for redirecting the propagated light into the third optical path.

4. The optical system of claim 1 wherein the input tilted surface includes a length dimension sufficiently large for receiving the collimated light projected from the collimator and redirecting the collimated light for propagation in the second optical path.

5. The optical system of claim 1 wherein the first optical path is oriented substantially parallel to the third optical path and substantially normal to the second optical path, and
   the collimated light is projected in the first optical path in a direction opposite to light directed to the viewer's eye in the third optical path.

6. The optical system of claim 1 wherein the image source includes a surface that is curved.

7. The optical system of claim 1 wherein the image source includes a surface that is flat.

8. The optical system of claim 1 wherein a diffractive optical element (DOE) is disposed on one of the opposing planar surfaces of the planar diffractive relay for receiving the collimated light along the first optical path and converging the collimated light onto the input tilted surface.

9. The optical system of claim 8 wherein the collimator is oriented along the cheek of the viewer, and the planar diffractive relay is disposed directly in front of the viewer's eye, having a forward projection, measured from the viewer's eye, of less than 45 mm.

10. The optical system of claim 1 wherein the longitudinally oriented opposing planar surfaces are substantially parallel to each other,
    the intermediate image is formed entirely within the planar diffractive relay, and
    the intermediate image, formed on a plane, is substantially perpendicular to both of the opposing planar surfaces.

11. An optical system for directing image light to a viewer's eye comprising:
    a planar diffractive relay mounted on a helmet having a substantially planar body section, terminated at input and output ends, through which image light is directed,
    a pair of opposing first and second reflective surfaces located, respectively, at the input and output ends, and each angled relative to the planar body section for (a) directing the image light entering the planar body section at the input end along an optical path within the planar body section, and (b) redirecting the image light within the planar body section at the output end along an optical output path directed toward the viewer's eye, and
    each reflective surface having (a) an angular value relative to the planar body section of at least half a critical angle for producing substantially total internal reflection within the planar body section, and (b) a length dimension sufficiently large for preventing the image light from striking each reflective surface more than once,
    wherein an intermediate image is formed within the planar body section, and
    the intermediate image is substantially perpendicular to the planar body section.

12. The optical system of claim 11 including
a first diffractive optical element (DOE) disposed adjacently to the input end for converging the image light onto the first reflective surface; and
a second DOE disposed adjacently to the output end for collimating redirected image light from the second reflective surface toward the viewer's eye.

13. The optical system of claim 12 wherein a least one of the first and second DOEs is formed on a surface of an aspheric lens.

14. The optical system of claim 12 wherein at least one of the first and second DOEs is a Kinoform diffractive lens.

15. The optical system of claim 14 wherein the Kinoform diffractive lens transmits light of a different wavelength than a wavelength of the image light originating at a source.

16. The optical system of claim 12 wherein at least one of the first and second DOEs is a sandwiched holographic lens.

17. The optical system of claim 12 including
a collimator for receiving the image light from a source and projecting the received image light onto the first DOE, the collimator providing a first chromatic aberration of the image light, and
at least one of the first and second DOEs providing a second chromatic aberration of the image light,
wherein the first chromatic aberration includes a value that is equal and opposite to a value of the second chromatic aberration.

18. The optical system of claim 11 wherein the longitudinally oriented opposing planar surfaces are substantially parallel to each other,
the intermediate image is formed entirely within the planar diffractive relay, and
the intermediate image, formed on a plane, is substantially perpendicular to both of the opposing planar surfaces.

19. An optical system for directing image light to a viewer's eye comprising:
a planar diffractive relay mounted on a helmet having a substantially planar body section, terminated in a pair of opposing first and second tilted surfaces, each tilted surface angled relative to the planar body section for (a) directing the image light entering the planar body section adjacently to the first tilted surface along an optical path within the planar body section, and (b) redirecting the image light within the planar body section adjacently to the second tilted surface along an optical output path directed toward the viewer's eye,
each tilted surface having an angular value relative to the planar body section of at least half a critical angle for producing substantially total internal reflection within the planar body section,
a first DOE formed on the first tilted surface for converging the image light directed along the optical path within the planar body section, and
a second DOE formed on the second tilted surface for collimating the image light redirected along the optical output path toward the viewer's eye,
wherein an intermediate image is formed within the planar body section, and
the intermediate image is substantially perpendicular to the planar body section.

20. The optical system of claim 19 wherein one of the first and second DOEs includes a reflective hologram.

21. The optical system of claim 20 wherein the reflective hologram includes a narrow band Bragg reflector.

22. The optical system of claim 21 wherein the image light striking the narrow band Bragg reflector a second time is undeviated.

23. The optical system of claim 19 wherein each tilted surface includes a length dimension sufficiently large for preventing the image light from striking each tilted surface more than once.

24. The optical system of claim 19 including
a collimator for receiving the image light from a source and projecting the received image light onto the first DOE, the collimator providing a first chromatic aberration of the image light, and
at least one of the first and second DOEs providing a second chromatic aberration of the image light,
wherein the first chromatic aberration includes a value that is equal and opposite to a value of the second chromatic aberration.

25. The optical system of claim 19 wherein the longitudinally oriented opposing planar surfaces are substantially parallel to each other,
the intermediate image is formed entirely within the planar diffractive relay, and
the intermediate image, formed on a plane, is substantially perpendicular to both of the opposing planar surfaces.

* * * * *